(12) United States Patent
Ogomi et al.

(10) Patent No.: US 11,451,683 B2
(45) Date of Patent: Sep. 20, 2022

(54) IMAGE READING DEVICE

(71) Applicant: Mitsubishi Electric Corporation, Chiyoda-ku (JP)

(72) Inventors: Tomokazu Ogomi, Chiyoda-ku (JP); Naoyuki Tokida, Chiyoda-ku (JP); Hideki Matsui, Chiyoda-ku (JP); Tatsuya Kunieda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 222 days.

(21) Appl. No.: 16/761,092

(22) PCT Filed: Dec. 26, 2018

(86) PCT No.: PCT/JP2018/047833
§ 371 (c)(1),
(2) Date: May 1, 2020

(87) PCT Pub. No.: WO2019/138878
PCT Pub. Date: Jul. 18, 2019

(65) Prior Publication Data
US 2020/0358918 A1 Nov. 12, 2020

(30) Foreign Application Priority Data

Jan. 11, 2018 (JP) .............................. JP2018-002416

(51) Int. Cl.
*H04N 1/04* (2006.01)
*H04N 1/00* (2006.01)
*G07D 7/026* (2016.01)

(52) U.S. Cl.
CPC ......... *H04N 1/00816* (2013.01); *G07D 7/026* (2013.01); *G07D 2207/00* (2013.01)

(58) Field of Classification Search
None
See application file for complete search history.

(56) References Cited

U.S. PATENT DOCUMENTS 10,347,068 B2 * 7/2019 Kagano ................ G06V 10/147
2007/0216976 A1 9/2007 Endo et al.
(Continued)

FOREIGN PATENT DOCUMENTS

CN 203800995 U * 8/2014
CN 203800995 U 8/2014
(Continued)

OTHER PUBLICATIONS

International Search Report dated Feb. 26, 2019 in PCT/JP2018/047833 filed on Dec. 26, 2018, 2 pages.
(Continued)

*Primary Examiner* — Dung D Tran
(74) *Attorney, Agent, or Firm* — Oblon, McClelland, Maier & Neustadt, L.L.P.

(57) ABSTRACT

A capacitance detection device includes a first electrode (1) and a second electrode (2) at least partially facing each other with a conveyance path (5) therebetween, the conveyance path extending along a conveyance direction in which a sheet-like detection object (3) is conveyed, an oscillating circuit to form an electric field (9) between the first electrode (1) and the second electrode (2), a detection circuit to detect a change in capacitance between the first electrode (1) and the second electrode (2), a first board (11) and a second board (12) including at least one of the oscillating circuit or the detection circuit, an insulative first plate (6) arranged between the first electrode (1) and the conveyance path (5), and an insulative second plate (7) arranged between the second electrode (2) and the conveyance path (5).

10 Claims, 33 Drawing Sheets

(56) References Cited

U.S. PATENT DOCUMENTS

| | | | |
|---|---|---|---|
| 2010/0117295 A1 | 5/2010 | Miyamoto | |
| 2011/0309572 A1* | 12/2011 | Miyamoto | G01B 7/087 |
| | | | 271/265.04 |
| 2014/0003018 A1 | 1/2014 | Fujimori | |
| 2015/0042353 A1* | 2/2015 | Jang | G07D 7/026 |
| | | | 324/452 |
| 2017/0187896 A1 | 6/2017 | Ogomi et al. | |
| 2019/0088065 A1* | 3/2019 | Kagano | H04N 1/00795 |
| 2019/0139349 A1* | 5/2019 | Kagano | G06V 10/147 |
| 2019/0154616 A1* | 5/2019 | Wakabayashi | G01R 27/2605 |
| 2020/0318941 A1* | 10/2020 | Jiang | G01B 7/087 |

FOREIGN PATENT DOCUMENTS

| | | |
|---|---|---|
| JP | 8-31159 B2 | 3/1996 |
| JP | 2000-196240 A | 7/2000 |
| JP | 2001-240271 A | 9/2001 |
| JP | 2004-310157 A | 11/2004 |
| JP | 2005-10968 A | 1/2005 |
| JP | 2007-197135 A | 8/2007 |
| JP | 2007-249475 A | 9/2007 |
| JP | 2012-186301 A | 9/2012 |
| JP | 2016-206752 A | 12/2016 |
| WO | WO 2009/013787 A1 | 1/2009 |
| WO | WO 2016/052613 A1 | 4/2016 |

OTHER PUBLICATIONS

Japanese Office Action dated Sep. 24, 2019 in Japanese Patent Application No. 2019-526336 (with unedited computer-generated English translation), 8 total pages.

Japanese Office Action dated Feb. 17, 2020 in Japanese Patent Application No. 2019-526336 (with unedited computer-generated English translation), 6 total pages.

Japanese Office Action dated Sep. 24, 2019 in Japanese Patent Application No. 2019-117192 (with unedited computer-generated English translation), 8 total pages.

Japanese Office Action dated Feb. 19, 2020 in Japanese Patent Application No. 2019-117192 (with unedited computer-generated English translation), 6 total pages.

Japanese Office Action dated Feb. 19, 2020 in Japanese Patent Application No. 2019-117194 (with unedited computer-generated English translation), 7 total pages.

Combined Chinese Office Action and Search Report dated Jul. 15, 2021 in Chinese Patent Application No. 201880085572.0 (with English translation), 37 pages.

\* cited by examiner

IMAGE READING DEVICE

TECHNICAL FIELD

The present disclosure relates to a capacitance detection device that detects a change in capacitance between electrodes arranged such that a detection object is to be therebetween, and an image reading device including the capacitance detection device.

BACKGROUND ART

There is conventionally known a device that detects capacitance between electrodes arranged sandwiching a sheet-like detection object such as bank bills and securities, and detects attachment of, for example, foreign matter such as a minute piece of a tape on the surface thereof (for example, Patent Literature 1). In addition, there is conventionally known a device including a capacitance sensor that detects a change in capacitance and a sensor that detects other information to discriminate between authentic and counterfeit detection objects, that is, to perform authentication (for example, Patent Literature 2). The capacitance sensor that is disclosed in Patent Literatures 1 and 2 as a device that detects the change in capacitance detects the change in capacitance between electrodes caused by conveyance of the detection object between the electrodes of a parallel-plate capacitor.

The devices disclosed in Patent Literatures 1 and 2 are applicable to a device required to determine authenticity of sheet-like detection objects such as bank bills and securities. Examples of such a device for determining authenticity include an automated teller/telling machine (ATM), a money changer, a cash dispenser, a ticket machine, and a vending machine. The ATM, for determination of authenticity of the detection object, is known to include a paper thickness detection device including a compression-type roller and an ultrasonic sensor to detect thickness of a piece of paper. Use of this paper thickness detection device enables determination of whether the bank bills and securities have an unusual paper sheet thickness. Attachment of foreign matter on the bank bills and securities can be detected based on the determination of the paper thickness and the change in capacitance.

Damaged bank bills and securities are sometimes repaired with, for example, a piece of transparent resin tape for reuse. To prevent circulation of the repaired bank bills and securities in the market, the ATM detects the attachment of foreign matter on the bank bills and securities that are the detection object, and collects such bank bills and securities inside the ATM upon such detection. As disclosed in Patent Literature 2, for example, the ATM detects a bank bill and securities that are repaired with a piece of a tape or paper, collects in a reject box bank bills having a part with a repaired tear. When the detected bank bill is an altered bank bill made by connecting strip-like pieces of bank bill together, for example, the bank bill is returned to a bank bill depositing and dispensing port. Note that a bank bill thickness sensor disclosed in Patent Literature 2 detects the detection object that is at least double-stacked while the detection object is being conveyed.

Furthermore, an image reading device that optically reads a sheet-like detection object such as bank bills and securities for image information is known (for example, Patent Literature 3). An image reading device disclosed in Patent Literature 3 includes a plurality of light sources. Patent Literature 3 discloses in FIG. 24 the image reading device including a light shading member that prevents the light emitted by the light source from radiating outside of a desired area.

CITATION LIST

Patent Literature

Patent Literature 1: Unexamined Japanese Patent Application Publication No. 2001-240271
Patent Literature 2: Unexamined Japanese Patent Application Publication No. 2005-10968
Patent Literature 3: Unexamined Japanese Patent Application Publication No. 2007-249475

SUMMARY OF INVENTION

Technical Problem

As described above, a paper thickness detection device is necessary for preventing circulation of repaired bank bills and securities. However, the paper thickness detection device including the compression-type roller and the ultrasonic sensor causes increasing size and cost of the ATM. To address this, as disclosed in Patent Literature 1, detecting the attachment of the foreign matter instead of the thickness of the detection object is effective for prevention of circulation of the repaired bank bills and securities. However, a device for detecting a capacitance disclosed in Patent Literature 1 includes a capacitance detection electrode having a three-dimensional shape for which miniaturization is difficult. Chamfering the corners of the dielectric material covering the electrodes is to be performed, and thus miniaturization of this shape is difficult. Thus, the device for detecting the capacitance disclosed in Patent Literature 1 has such a complex structure that size reduction and disassembly of the device are limited.

In addition, Patent Literature 2 discloses an upper transfer roller and a lower transfer roller that are provided for transferring a detection object between an upper transfer guide and a lower transfer guide. A capacitance sensor disclosed in Patent Literature 2 has trapezoidal projections each located co-linearly with the upper transfer roller and the lower transfer roller. The capacitance sensor is formed by providing an application electrode and a detection electrode to surfaces of two projections on sides facing the detection object. Thus, the capacitance sensor disclosed in Patent Literature 2 has such a complex structure that size reduction and disassembly of the device are limited.

As disclosed above, the device for detecting a capacitance disclosed in Patent Literature 1 and the capacitance sensor disclosed in Patent literature 2 have a problem of complex configuration. Furthermore, a conventional capacitance sensor has problem of not having high compatibility with a device or sensor for detecting information other than information on the change in capacitance by the detection object. Typical examples of the device and sensor for detecting information other than information on the change in capacitance include the sensor disclosed in Patent Literature 2 and the above-described ultrasonic sensor. Patent Literature 2 discloses an image sensor for detecting a print pattern (image) on the detection object, a magnetic sensor for detecting a magnetic pattern of the detection object, and a fluorescence sensor for detecting a fluorescence image of the detection object.

In consideration of the aforementioned circumstances, objectives of the present disclosure are miniaturization and simplification of structure of a capacitance detection device and an image reading device including the capacitance detection device.

Solution to Problem

In order to attain the aforementioned objective, a capacitance detection device according to the present disclosure includes a first electrode and a second electrode at least partially facing each other with a conveyance path therebetween, the conveyance path extending along a conveyance direction in which a sheet-like detection object is conveyed, an oscillating circuit to form an electric field between the first electrode and the second electrode, and a detection circuit to detect a change in capacitance between the first electrode and the second electrode. The capacitance detection device further includes a first board including at least one of the oscillating circuit or the detection circuit, and a second board including at least the other one of the oscillating circuit and the detection circuit. The first electrode and the second electrode are arranged on an upstream side or a downstream side of the conveyance path in the conveyance direction with respect to a reading position where an image of the detection object is read by an image reader.

Solution to Problem

Advantageous Effects of Invention

According to the present disclosure, an arrangement of the first electrode and the second electrode on an upstream side or a downstream side in the conveyance direction with respect to a reading position of an image reader enables size reduction in the conveyance direction, and thus achieves simple configuration and size reduction of the capacitance detection device.

DESCRIPTION OF EMBODIMENTS

Figure 1:
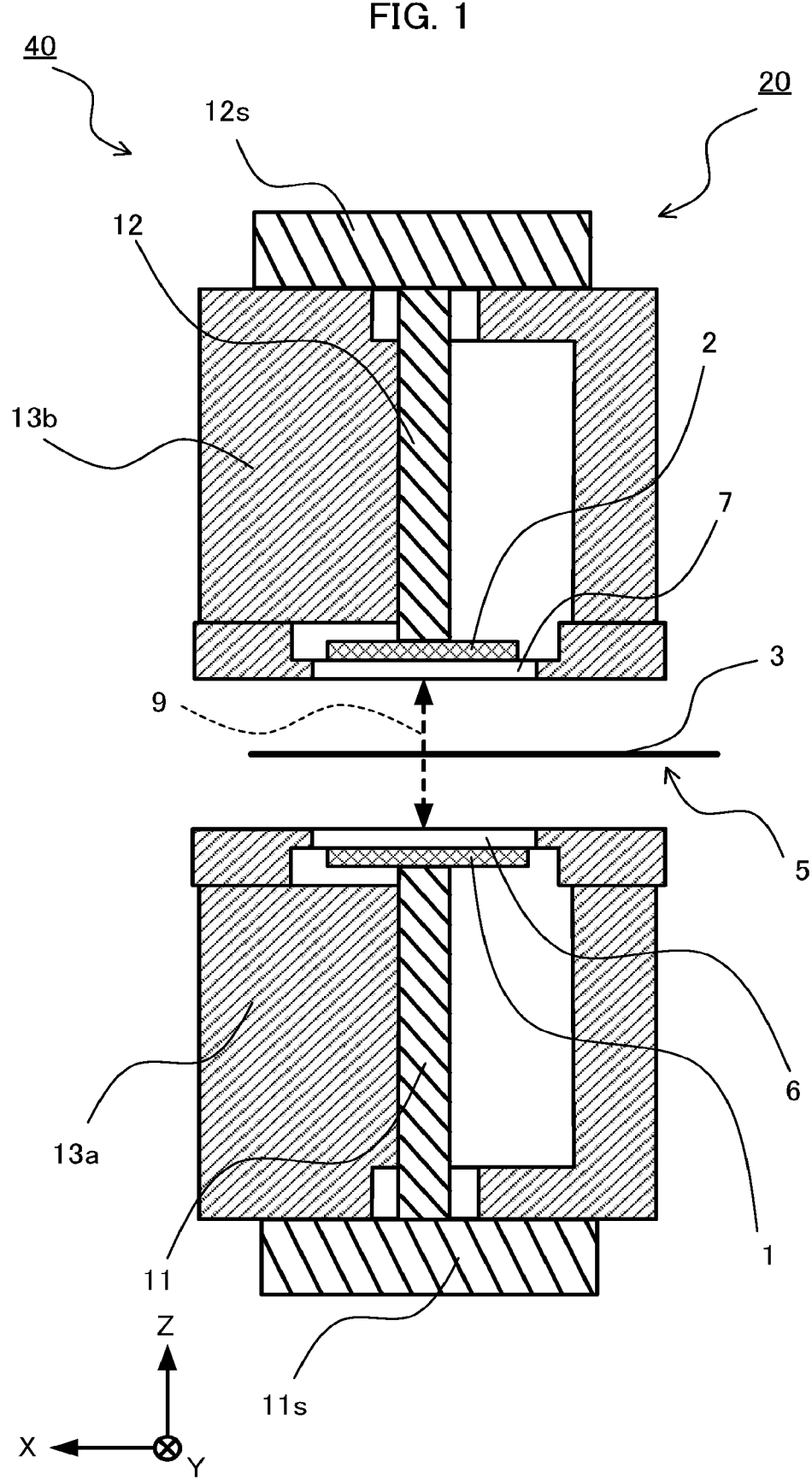
FIG. 1 is a cross-sectional view of a capacitance detection device according to Embodiment 1 of the present disclosure, taken along a conveyance direction and an electric field direction.

The embodiments according to this present disclosure are hereinafter described with reference to the drawings. Note that in each of the following embodiments, similar components are denoted by the same references and description thereof is omitted. In addition, in the drawings, an X-axis direction is a conveyance direction, indicating a direction in which a detection object is conveyed. A Y-axis direction is a direction perpendicular to the conveyance direction in a conveyance plane, indicating an arrangement direction. A Z-axis direction is a direction perpendicular to the X-axis direction and the Y-axis direction, indicating an electric field direction and a direction of height of a capacitance detection device or an image reading device. The conveyance direction includes not only a movement direction of the detection object in the case where the detection object is conveyed, but also a movement direction of the capacitance detection device or the image reading device in the case where the detection object is fixed while the capacitance detection device or the image reading device moves. The arrangement direction is also referred to as a main-scanning direction. The conveyance direction is also referred to as a sub-scanning direction. The electric field direction is also referred to as an optical-axis direction. The main-scanning direction, the sub-scanning direction, and the optical-axis direction are described in detail in the description of the image reading device.

Embodiment 1

The main configuration of a capacitance detection device 20 according to Embodiment 1 is described with reference to FIGS. 1 to 9. The capacitance detection device 20 is included in an image reading device 40. FIG. 1 is a cross-sectional view of the capacitance detection device 20 according to the present embodiments, taken along the conveyance direction and the electric field direction. In FIG. 1, a first electrode 1 and a second electrode 2 face each other with a conveyance path 5 therebetween, the conveyance path 5 extending along the conveyance direction in which a sheet-like detection object 3 is conveyed. The detection object 3 is conveyed in a positive X-axis direction. The positive X-axis direction is a positive direction along the X-axis, indicating a direction from an upstream toward a downstream in the conveyance direction. The detection object 3 is any such object as long as the object for which capacitance is detected has a sheet-like shape. Examples of such objects include printed items such as bank bills and securities. A first plate 6 is an insulating plate to which the first electrode 1 is formed. A second plate 7 is an insulating plate on which the second electrode 2 is formed. The first electrode 1 and the second electrode 2 are formed respectively to the first plate 6 and the second plate 7 by using printing techniques.

The first electrode 1 and the second electrode 2 each have a length of a few millimeters to a few centimeters in the conveyance direction. The first electrode 1 and the second electrode 2 do not necessarily have the same length in the conveyance direction as each other. In addition, the first electrode 1 and the second electrode 2 may at least partially face each other in the electric field direction. In other words, the first electrode 1 and the second electrode 2 may at least partially overlap with each other in the conveyance direction and the arrangement direction. That is, the first electrode 1 may be out of line with the second electrode 2 in the conveyance direction as long as the electrodes serve as a parallel-flat-plate capacitor. Similarly, the first electrode 1 may be out of line with the second electrode 2 in the arrangement direction.

Figure 2:
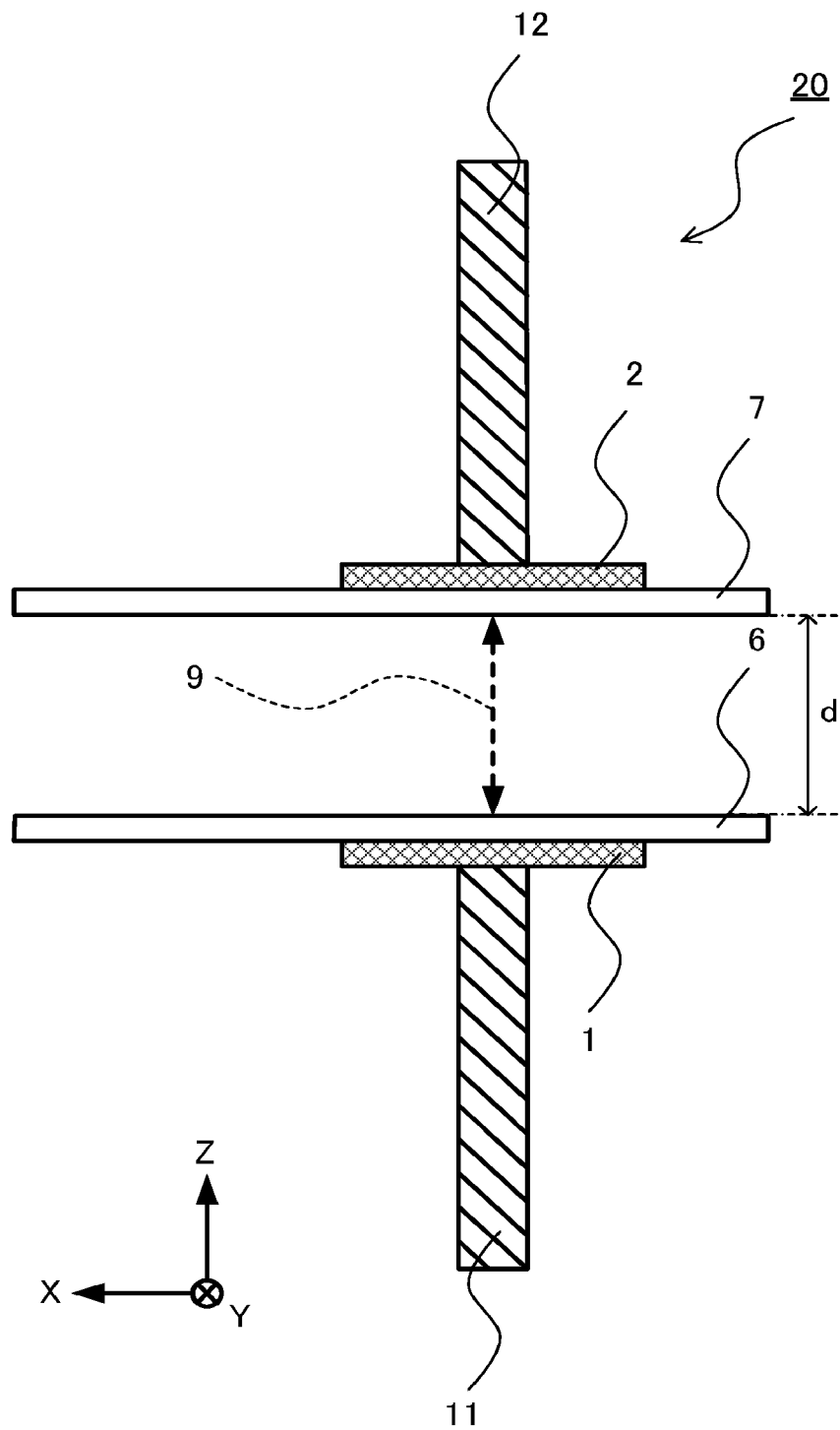
FIG. 2 is a cross-sectional view of the main section of the capacitance detection device according to Embodiment 1, taken along the conveyance direction and the electric field direction.

In FIG. 1, an oscillating circuit forms an electric field 9 between the first electrode 1 and the second electrode 2. That is, the electric field 9 is formed in at least a part of a space in the conveyance path 5 by the oscillating circuit. In the drawings, the electric field 9 is indicated by dashed lines with arrows at both ends. The electric field 9 is formed along a Z-axis direction. In addition, the electric field 9 is formed within a predetermined distance between the first plate 6 and the second plate 7, that is, within a gap d. As illustrated in FIG. 2, the gap d is a length in the electric field direction between the first plate 6 and the second plate 7.

A detection circuit detects a change in capacitance between the first electrode 1 and the second electrode 2. At least one of the oscillating circuit or the detection circuit is formed on a first board 11, while at least the other of the oscillating circuit or the detection circuit is formed to the second board 12. In an example of FIG. 1, the first board 11 has a side surface facing the first electrode 1 (first plate 6) in the electric field direction. In addition, the second board 12 has a side surface facing the second electrode 2 (second plate 7) in the electric field direction. The first board 11 and the second board 12 each have a thin-plate shape having the side surface with a length in the conveyance direction that is shorter than that of a main surface in the electric field direction. That is, the main surface of each of the first board 11 and the second board 12 extends perpendicularly with respect to the conveyance direction.

Furthermore, in FIG. 1, a housing 13a and a housing 13b each are a housing of the capacitance detection device 20. The housing 13a internally houses the first board 11. The housing 13b internally houses the second board 12. The first board 1 and the second board 12 each are a circuit board extending along the electric field direction. In the description of each embodiment, the oscillating circuit is taken to be formed to the first board 11 while the detection circuit is taken to be formed to the second board 12. Of course, the detection circuit may be formed to the first board 11 while the oscillating circuit may be formed to the second board 12. The first plate 6 to which the first electrode 1 is formed on the interior side of the housing 13a is provided at the surface of the housing 13a on a conveyance path 5 side. The second plate 7 which the second electrode 2 is formed at the interior side of the housing 13b is provided at a surface of the housing 13b on a conveyance path 5 side. The conveyance path 5 refers to a location through which the detection object 3 passes between the housing 13a and the housing 13b. In addition, the gap d refers to a distance between the first plate 6 and the second plate 7 in the electric field direction.

In the capacitance detection device 20 illustrated in FIG. 1, the detection object 3 is conveyed in the conveyance direction along the conveyance path 5 between the first plate 6 and the second plate 7 that are spaced apart from each other with the gap d. At this time, the first electrode 1 and the second electrode 2 form a parallel-flat-plate capacitor with the gap d, and form the electric field 9 in the conveyance path 5. Thus, the insertion of the detection object 3, that is a dielectric material, into the parallel-flat-plate capacitor increases an amount of stored electric charge, thereby causing a change in capacitance of the parallel-flat-plate capacitor. The change in the capacitance of the parallel-flat-plate capacitor can be detected by the oscillating circuit and the detection circuit. When the capacitance to be detected is known in advance, the conveyed detection object 3 can be identified based on a detection value of the capacitance.

The detection circuit may include a function of identifying the detection object 3. Alternatively, an identification circuit having an identification function may be provided exterior to the detection circuit. Note that when dielectric foreign matter such as a piece of a tape is attached on the detection object 3, the amount of the stored electric charge in the parallel-flat-plate capacitor increases and the capacitance increases, as compared to the case without attachment of the foreign matter.

The configurations of an insulating first plate 6 and an insulating second plate 7 included in the capacitance detection device 20 are described below. The first plate 6 is located between the first electrode 1 and the conveyance path 5. The second plate 7 is located between the second electrode 2 and the conveyance path 5. In the present embodiment, the first electrode 1 is formed directly on the first plate 6, and the second electrode 2 is formed directly on the second plate 7.

Figure 3:
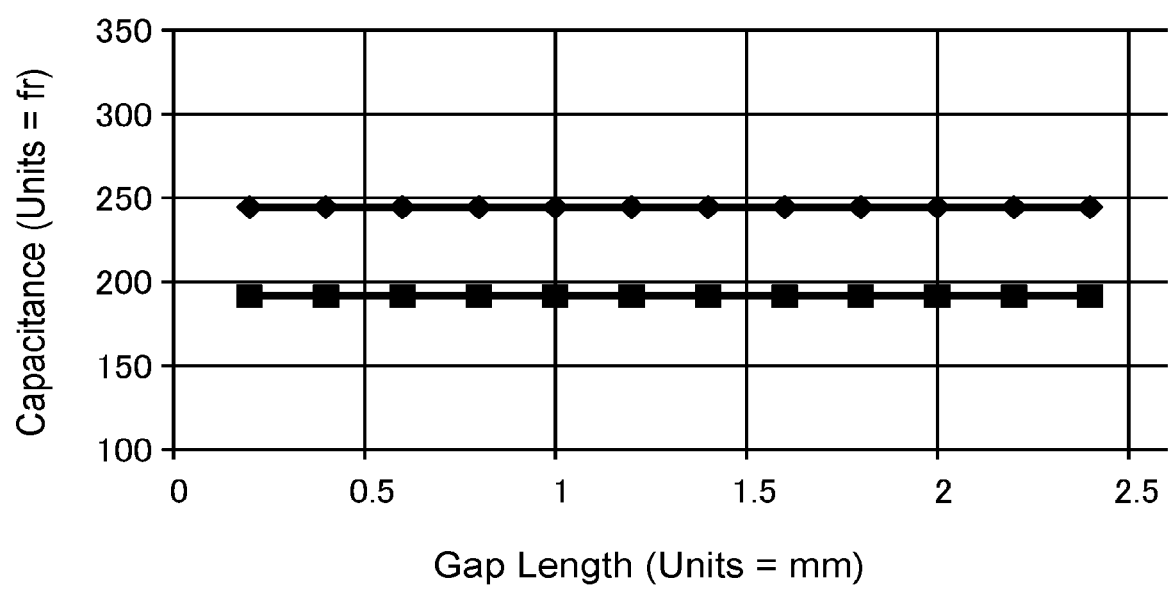
FIG. 3 is a graph indicating an example of detection values obtained by the capacitance detection device according to Embodiment 1.
Figure 4:
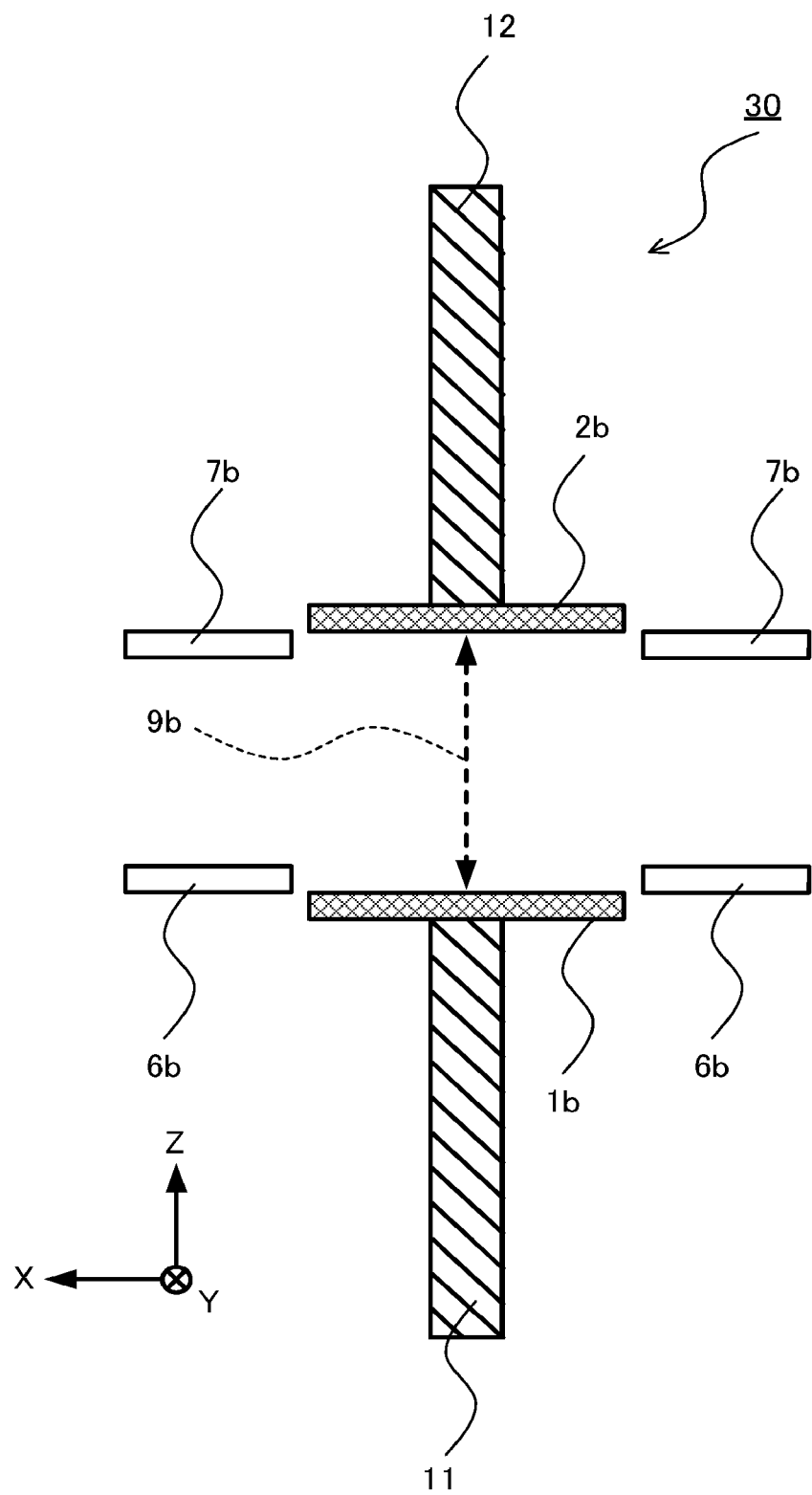
FIG. 4 is a cross-sectional view of the main section of a comparative example of the capacitance detection device according to Embodiment 1, taken along the conveyance direction and the electric field direction.
Figure 5:
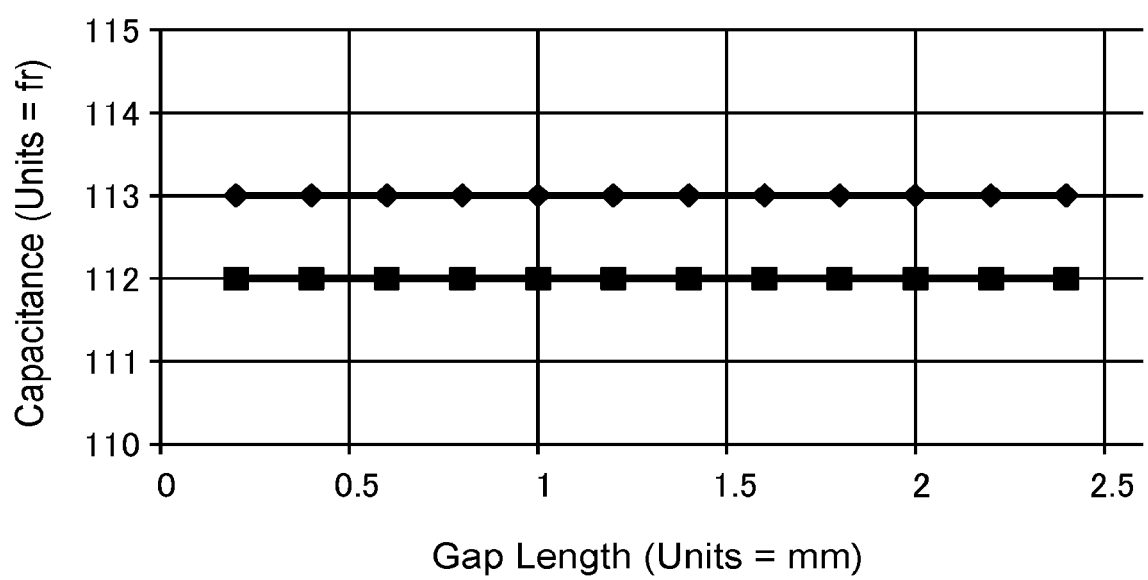
FIG. 5 is a graph indicating an example of detection values obtained by the comparative example of the capacitance detection device according to Embodiment 1.

Next, the operation of the capacitance detection device 20 according to Embodiment 1 is further described with reference to FIGS. 2 to 5. FIG. 2 is a cross-sectional view of the main section of the capacitance detection device according to the present embodiment, taken along the conveyance direction and the electric field direction. FIG. 3 is a graph indicating an example of the values detected by the capacitance detection device according to the present embodiment. FIG. 4 is a cross-sectional view of the main section of a comparative example of the capacitance detection device, taken along the conveyance direction and the electric field direction. FIG. 5 is a graph indicating an example of detection values of the comparative example of the capacitance detection device.

As illustrated in FIG. 2, the electric field 9 is formed between the first plate 6 on which the first electrode 1 is formed and the second plate 7 on which the second electrode 2 is formed, that is, within the gap d. FIG. 3 is a graph indicating variation of detection values of the capacitance with respect to locations between the first electrode 1 and the second electrode 2 in the case of a gap d of 2.5 mm. The horizontal axis of FIG. 3 indicates how far from the first plate 6 the detection object 3 is conveyed. That is, a gap length of 0 mm indicates conveyance at the surface of the first plate 6 and the gap length of 2.5 mm indicates conveyance at the surface of the second plate 7. The vertical axis of FIG. 3 indicates the detection values of the capacitance. In FIG. 3, black rhombuses indicate the detection values obtained in the case where a piece of the tape adhered to the detection object 3. In addition, black squares indicate the detection values obtained in the case where a piece of the tape was not attached on the detection object 3.

The detection values of the capacitance indicated in FIG. 3 indicate that, regardless of the presence or absence of a piece of the tape, the detection values of the capacitance did not change even when the gap length varied. Furthermore, FIG. 3 indicates that the detection values of the capacitance were large values in a range from 200 to 250 fr. This results from increased capacitance of the parallel-flat-plate capacitor due to the first plate 6 and the second plate 7 that are dielectric materials disposed in contact respectively with the first electrode 1 and the second electrode 2 that are the detection electrodes.

In contrast, a capacitance detection device 30 that is a comparative example of the capacitance detection device 20 according to Embodiment 1 is described below. In the capacitance detection device 30 illustrated in FIG. 4, a first electrode 1b and a second electrode 2b are not formed respectively on a first plate 6b and a second plate 7b that are dielectric materials. The first electrode 1b and the second electrode 2b each have a length of a few millimeters to a few centimeters. The first electrode 1b and the second electrode 2b are made of a metal plate. The first board 11 is disposed such that the side surface of the first board 11 faces the first electrode 1b in the electric field direction. Similarly, the second board 12 is disposed such that a side surface of the second board 12 faces the second electrode 2b in the electric field direction. As illustrated in FIG. 4, the electric field 9b is formed between the first electrode 1b and the second electrode 2b. To prevent the detection object 3 conveyed along the conveyance direction from contacting the first electrode 1b and the second electrode 2b, the first plates 6b and the second plates 7b are disposed to face each other with the conveyance path 5 therebetween, and at each of the upstream side and the downstream side in the conveyance direction. Disposal of the first plate 6b and the second plate 7b on only one of the upstream side and the downstream side of the conveyance direction is permissible.

FIG. 5 is a graph indicating variations of the detection values of the capacitance with respect to the locations between the first electrode 1b and the second electrode 2b of the capacitance detection device 30 in the case in which a distance between the first electrode 1b and the second electrode 2b was 2.5 mm. The horizontal axis of FIG. 5 indicates how far from the first electrode 1b the detection object 3 was conveyed. That is, the gap length of 0 mm indicates conveyance at the surface of the first electrode 1b while the gap length of 2.5 mm indicates conveyance at the surface of the second electrode 2b. The vertical axis of FIG. 5 indicates the detection values of the capacitance. FIG. 5 is annotated in the same manner as FIG. 3.

The detection values of the capacitance indicated in FIG. 5 indicate that, regardless of the presence or absence of a piece of the tape, the detection values of the capacitance did not change even when the gap length varied. However, FIG. 5 illustrates that the detection values of the capacitance were small values in a range of 112 to 113 fr, in contrast to the capacitance detection device 20 according to Embodiment 1. This is because the first electrode 1b and the second electrode 2b that are detection electrodes are not disposed in contact respectively with the first plate 6b and the second plate 7b that are the dielectric material.

Figure 6:
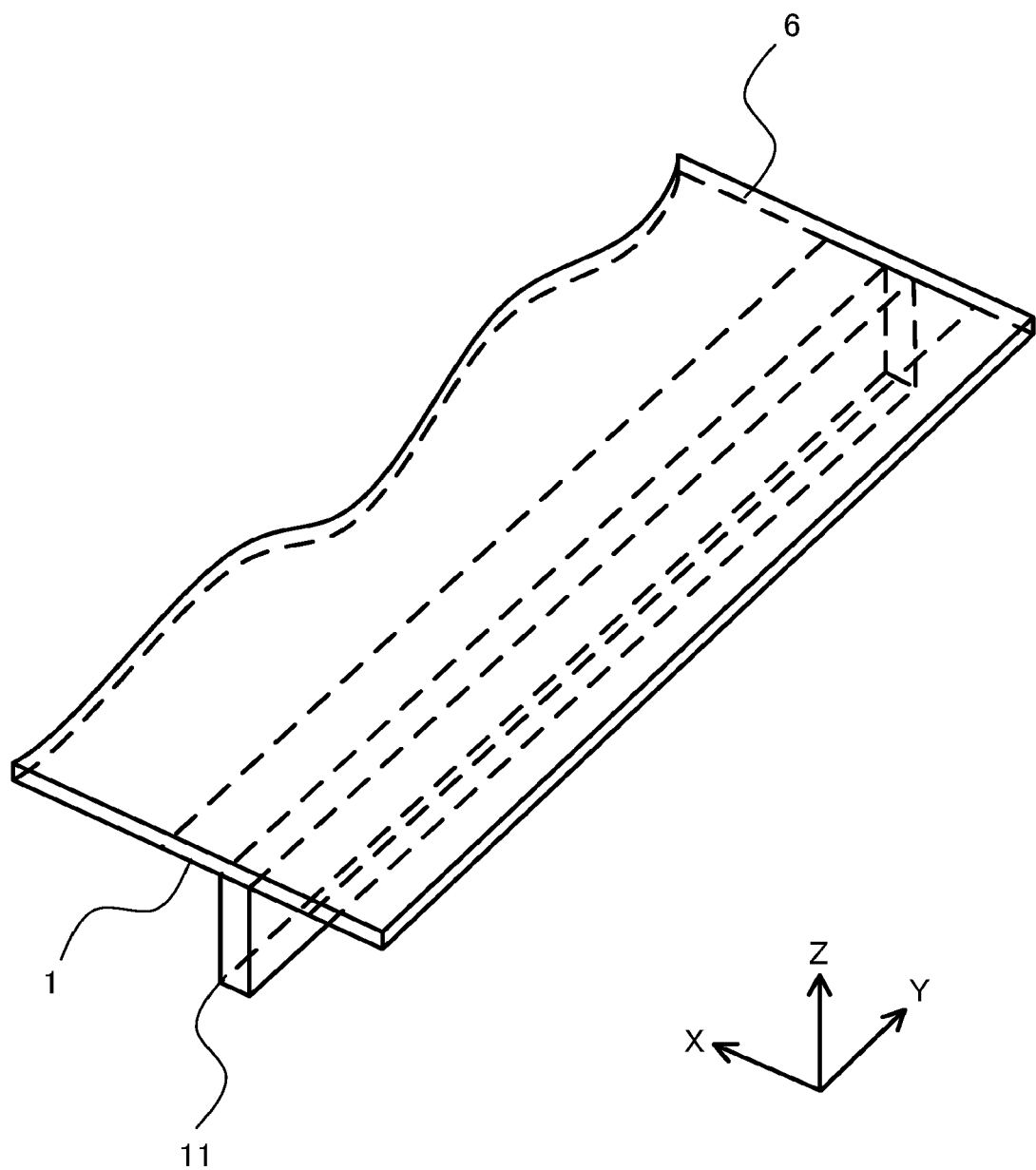
FIG. 6 is a perspective view of the main section of the capacitance detection device according to Embodiment 1.

FIG. 6 is a perspective view of the main section of the housing 13a side of the capacitance detection device 20 according to Embodiment 1. In FIG. 6, a single first electrode 1 is disposed along the arrangement direction. The arrangement direction aligns with the longitudinal direction or transverse direction of the detection object 3. That is, the first electrode 1 has a length in the arrangement direction that is greater than or equal to the longitudinal direction or transverse direction of the detection object 3. The determination of whether the arrangement direction aligns with the longitudinal direction or the transverse direction of the detection object 3 is based on the orientation of the detection object 3 to be conveyed, and such determination is made similarly in the following descriptions. The first electrode 1 and the first board 11 are illustrated partially by dashed lines because of arrangement on the rear side of the first plate 6, that is, inside of the housing 13a. Although not illustrated, in the main section of the side of the housing 13b, a single second electrode 2 is disposed along the arrangement direction. That is, the second electrode 2 has a length in the arrangement direction that is greater than or equal to the length in the longitudinal direction or the transverse direction of the detection object 3. When the capacitance detection device 20 has a single first electrode 1 and a single second electrode 2, the capacitance detection device 20 has a single oscillating circuit and a single detection circuit The single first electrode 1 extends along arrangement direction illustrated in FIG. 6 and the single second electrode 2 extends along the arrangement direction to form the parallel-flat-plate capacitor. As aforementioned, the first electrode 1 may be out of line with the second electrode 2 in the conveyance direction as long as the electrodes serve as the parallel-flat-plate capacitor. Similarly, the first electrode 1 may be out of line with the second electrode 2 in the arrangement direction.

Figure 7:
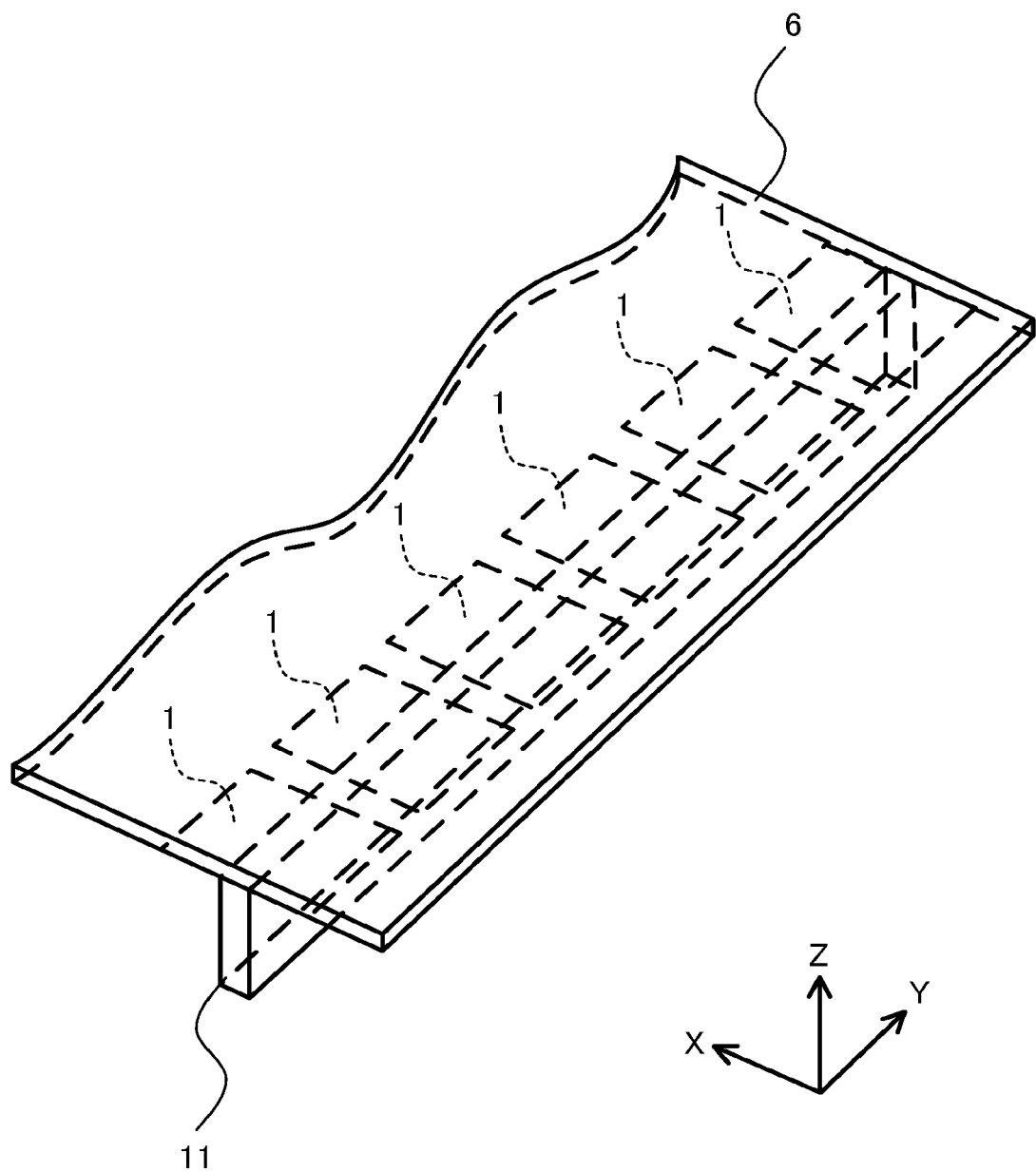
FIG. 7 is a perspective view of the main section of the capacitance detection device according to Embodiment 1.

FIG. 7 is a perspective view of the main section on the capacitance detection device 20 that is another example according to Embodiment 1, showing the housing 13a side. In FIG. 7, in contrast to FIG. 6, a plurality of first electrodes 1 is disposed along the arrangement direction. That is, a total length of the first electrodes 1 in the arrangement direction is greater than or equal to the length of the detection object 3 in the longitudinal direction or the transverse direction. The first electrode 1 and the first board 11 are illustrated partially by dashed lines because of arrangement at the rear side of the first plate 6, that is, inside of the housing 13a. Although not illustrated, in the main section on the housing 13b as well, a plurality of second electrodes 2 is disposed along the arrangement direction. That is, a total length of the second electrodes 2 in the arrangement direction is greater than or equal to a length of the detection object 3 in the longitudinal direction or the traverse direction. When the capacitance detection device 20 has an array of the first electrodes 1 and an array of the second electrodes 2, the capacitance detection device 20 has oscillating circuits and detection circuits for the respective first electrodes 1 and the second electrodes 2.

The first electrodes 1 arranged along the arrangement direction as illustrated in FIG. 7 and the second electrodes 2 arranged along the arrangement direction form the parallel-flat-plate capacitor. As aforementioned, the first electrodes 1 may be out of line with the second electrodes 2 in the conveyance direction as long as the electrodes serve as the parallel-flat-plate capacitor. Similarly, the first electrodes 1 may be out of line with the second electrodes 2 in the arrangement direction. Specifically, the entirety of the arranged first electrodes 1 may be out of line with the entirety of the arranged second electrodes 2 in the arrangement direction, or in the conveyance direction. In addition, an individual first electrode 1 and an individual second electrode 2 that at least partially face each other sandwiching the conveyance path 5 may be out of line with each other in the arrangement direction or in the conveyance direction.

In the capacitance detection device 20 according to Embodiment 1 and illustrated in FIG. 6, since the single first electrode 1 and the single second electrode 2 are formed along the arrangement direction, the detection values of the capacitance can be obtained while the detection object 3 is conveyed, and thus the capacitance of the detection values can be obtained along one dimension.

In addition, in the capacitance detection device 20 according to Embodiment 1 and as illustrated in FIG. 7, since the first electrodes 1 and the second electrodes 2 are formed along the arrangement direction, the capacitance along one dimension of the detection object 3 in the longitudinal direction or the transverse direction aligned with the arrangement direction can be detected. Furthermore, conveyance of the detection object 3 enables acquiring of information on multiple rows where a single row of the multiple rows includes the detection values of the capacitance along one dimension, and thus detection values of the capacitance along two dimensions can be eventually obtained.

Figure 8:
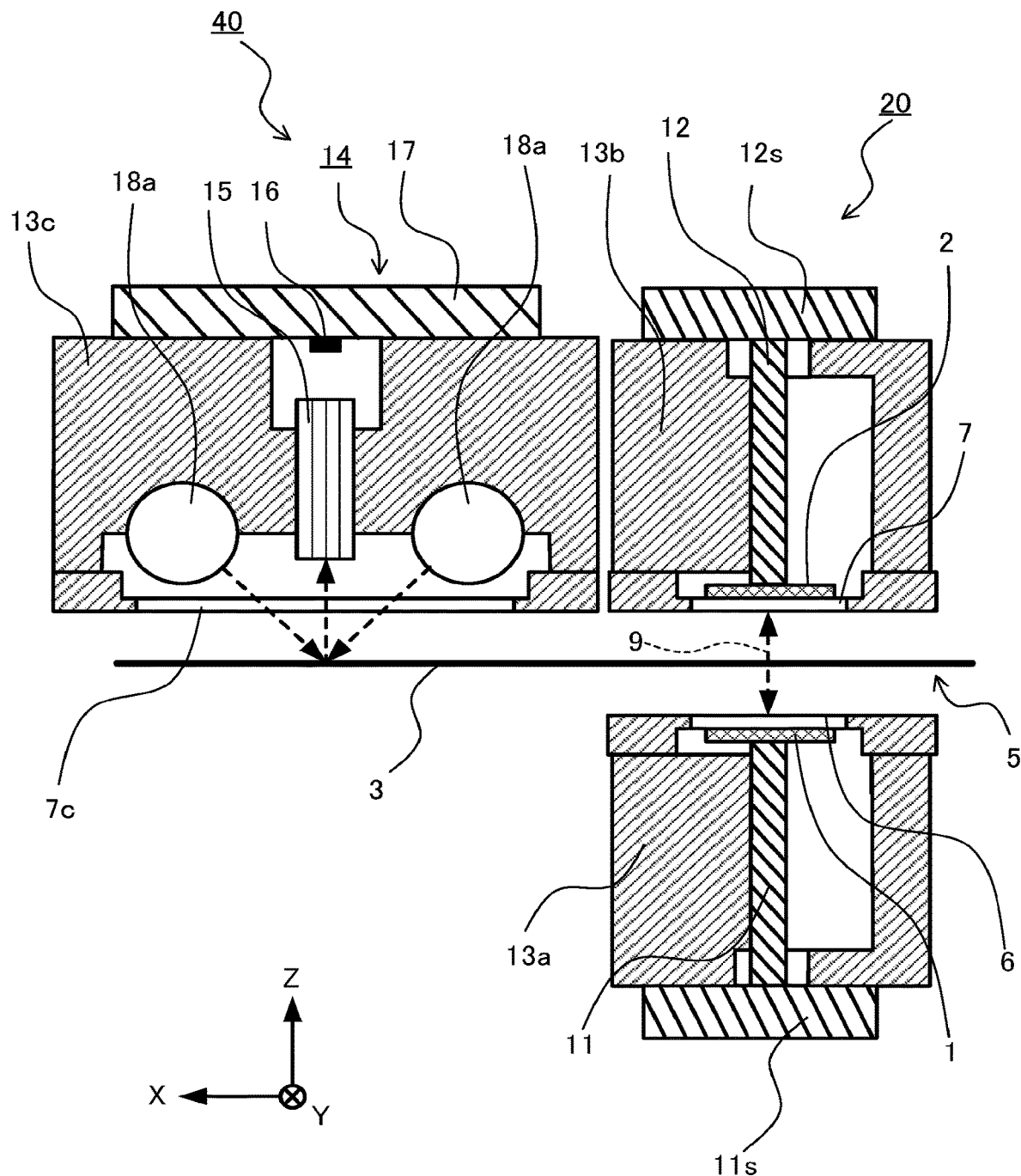
FIG. 8 is a cross-sectional view of an image reading device according to Embodiment 1, taken along the conveyance direction and the electric field direction.

Thus, the capacitance detection device 20 according to Embodiment 1 can easily detect the location of the adhering foreign matter such as a piece of the tape on the detection object 3, even when the bank bill disclosed in FIG. 8 of Patent Literature 2 (Unexamined Japanese Patent Application Publication No. 2005-10968) is the detection object 3. In other words, a region on the detection object 3 where the foreign matter is adhering can be identified. The identification circuit included inside or outside of the detection circuit can not only detect the type of the detection object 3, but also identify the location of the foreign matter on the detection object 3 while the detection object 3 is conveyed, based on the change in capacitance detected by the detection circuit. In this case, the capacitance detection device 20 also serves as a point sensor.

When the capacitance between the first electrode 1 and the second electrode 2 further changes while the detection object 3 of the determined type passes through the electric field 9, the identification circuit can determine that the foreign matter is attached on the detection object 3. This determination can be achieved when the change in capacitance caused by the detection object 3 for each type of the detection object 3 is known in advance. Thus, if a change in capacitance for each type of the foreign matter is known in advance when the foreign matter is attached on the detection object 3, the foreign matter adhered to the detection object 3 can also be identified. That is, the identification circuit can identify the type of the foreign matter attached on the detection object 3. For this reason, even when the foreign matter is attached on the entire surface of the detection object 3, the identification circuit can determine, based on the change in capacitance detected by the detection circuit, that the foreign matter is attached on the detection object 3 that is being conveyed. Also in this case, the identification circuit can determine the type of the foreign matter attached on the detection object 3.

The capacitance detection device 20 according to the present embodiment may include at least one of a circuit board 11 is electrically connected to the first board 11 or a circuit board 12s electrically connected to the second board 12. The technique for the electrical connection may be any typical technique for a circuit connection. FIG. 1 illustrates both the circuit board 11s and the circuit board 12s. The circuit board 11s is electrically connected to the first board 11 at a side surface of the first board 11 opposite to the first electrode 1. The circuit board 11s may be part of the first board 11. The circuit board 12s is electrically connected to the second board 12 at a side surface of the second board 12 opposite to the second electrode 2. The circuit board 12s may be part of the second board 12. The circuit board 11s or the circuit board 12s may include the oscillating circuit or the detection circuit. Furthermore, the circuit board 11s or the circuit board 12s may include the identification circuit. The circuit board 11s or the circuit board 12s may serve as interfaces with the exterior.

In the capacitance detection device 20 according to Embodiment 1, a main surface of at least one of the first board 11 or the second board 12 is arranged along the electric field direction, thereby easily achieving size reduction in the conveyance direction. Thus, the capacitance detection device 20 can achieve a high level of compatibility with a device or sensor for detecting information other than information on the change in the capacitance caused by the detection object 3.

As mentioned above, the capacitance detection device 20 according to Embodiment 1 can not only precisely detect the capacitance of the detection object 3, but also has a high level of compatibility with a device or sensor for detecting information other than information on the change in the capacitance caused by the detection object 3. Examples of the device or sensor for detecting information other than information on the change in capacitance caused by the detection object 3 include sensors disclosed in Patent Literature 2, a compression-type roller, and an ultrasonic sensor. Patent Literature 2 discloses an image sensor for detecting a print pattern on a detection object, a magnetic sensor for detecting a magnetic pattern of the detection object, and a fluorescence sensor for detecting a fluorescent image of the detection object. The fluorescence sensor may be one of functions of the image sensor.

The image reading device 40 according to the present embodiment is described with reference to FIG. 8. FIG. 8 is a cross-sectional view of the image reading device 40, taken along the conveyance direction and the electric field direction. The image reading device 40 includes the device or sensor for detecting information other than information on the change in capacitance caused by the detection object 3. The image reading device 40 includes an image reader 14 for reading an image of the detection object 3 and the capacitance detection device 20 having the first electrode 1 and the second electrode 2 that are arranged on the upstream side or downstream side of the image reader 14 in the conveyance direction of the conveyance path 5. That is, the first electrode 1 and the second electrode 2 are positioned on the upstream side or downstream side in the conveyance direction with respect to an image reading position of the image reader 14. FIG. 8 illustrates an example of arrangement of the first electrode 1 and the second electrode 2 on the upstream side in the conveyance direction of the conveyance path 5 with respect to the image reader 14.

In FIG. 8, a housing 13c is a housing of the image reader 14 disposed on the same side as the housing 13b, taking the conveyance path 5 as boundary. The housing 13c internally houses a lens element (imaging optical lens) 15, a sensor element (photo detector) 16, and light sources 18a. In addition, a circuit board 17 is formed on the side of the housing 13c opposite to a conveyance path 5 side. The image reader 14 includes at least a sensor element 16. The image reader 14 may include at least a lens element 15, light sources 18a or circuit board 17, in addition to the sensor element 16. Note that the circuit board 17 may include the circuit board 1 is or the circuit board 12s. In addition, the circuit board 17 may also include a circuit for supplying power or drive signals to the light sources 18a.

In FIG. 8, the lens element 15 converges light from the detection object 3. The lens element 15 is an imaging optical lens. The sensor element 16 receives the light converged by the lens element 15. In the present embodiment, a rod lens array of rod lenses arranged in the arrangement direction is used as the lens element 15. In addition, a multichip sensor having a plurality of sensors arranged in the arrangement direction is used as the sensor element 16. Thus, the arrangement direction is the main-scanning direction of the image reading device 40. In addition, the conveyance direction is a sub-scanning direction of the image reading device 40. Furthermore, the electric field direction is the optical-axis direction of the lens element 15 (image reader 14). Therefore, the main surface of at least one of the first board 11 or the second board 12 that are included in the capacitance detection device 20 is disposed parallel to the optical axis of the image reader 14. The optical axis of the image reader 14 (lens element 15) is parallel to a direction (Z-axis direction) that is perpendicular with respect to the conveyance direction.

The lens element 15 is not limited to being a rod lens array and may be a microlens array. In addition, the lens element 15 is not limited to an erecting equal magnification optical lens element such as the rod lens array and the microlens array, and may be a lens element used for image reading such as reduction optical system. Furthermore, the lens element 15 may be an imaging element.

When the lens element 15 is the erecting equal magnification optical lens element, the lens element 15 is disposed in the longitudinal direction or transverse direction of the detection object 3. That is, similarly to the first electrode 1 and the second electrode 2, the lens element 15 has the main-scanning direction length that is greater than or equal to the longitudinal-direction length or the transverse-direction length of the detection object 3. Similarly, when the sensor element 16 is the multichip sensor, the sensor element 16 is disposed in the longitudinal direction or transverse direction of the detection object 3. That is, similarly to the first electrode 1 and the second electrode 2, the sensor element 16 has the main-scanning-direction length that is greater than or equal to the longitudinal-direction length or the transverse-direction length of the detection object 3.

Furthermore, in FIG. 8, the circuit board 17 is a board on which the sensor element 16 is formed. The circuit board 17 performs photoelectric conversion of light received by the sensor element 16. The circuit board 17 may serve as a signal processing board that processes photoelectrically-converted signals. The signal processing board may be formed as another circuit separate from the circuit board 17 on which the sensor element 16 is formed. The light sources 18a as a light source for reflection of light has a light guide body extending in the main-scanning direction. The light guide body included in the light source 18a has a length in the main-scanning direction that is greater than or equal to the longitudinal-direction length or the transverse-direction length of the detection object 3. The light source 18a irradiates the detection object 3 with light in a linear pattern extending along the main-scanning direction. The circuit board 17 may include a circuit that supplies power or driven signals to the light sources including the light sources 18a.

A cover member 7c is provided to the housing 13c on the conveyance path 5 side. Material of the cover member 7c may be freely selected as long as the material transmits the light of the light source 18a. Examples of the material include glass or a transparent resin such as polycarbonate and acryl. As indicated by dashed arrows in FIG. 8, the light emitted from the light sources 18a is transmitted through the cover member 7c, and the detection object 3 is irradiated with the transmitted light. As indicated by dashed arrows along the optical-axis direction in FIG. 8, the emitted light is reflected on the detection object 3, and the reflected light is transmitted through the cover member 7c and received through the lens element 15 by the sensor element 16. The image reading device 40 obtains the image of the detection object 3 from the reflected and received light.

The image reading device 40 according to Embodiment 1 includes the capacitance detection device 20 reduced in size in a sub-scanning direction, thereby easily achieving overall size reduction. Note that at least one of the first plate 6 or the second plate 7 of the capacitance detection device 20 according to Embodiment 1 may be made using the same material as that of the cover member 7c, thereby achieving cost reduction. That is, at least one of the first plate 6 or the second plate 7 has a transmittance of the light emitted by the light source 18a that is larger than or equal to a threshold. The threshold is determined, for example, in accordance with the amount of light emitted by the light source 18a.

Furthermore, in order to simplify arrangement of the first plate 6 or the second plate 7 that is made using the same material as that of the cover member 7c, the first electrode 1 or the second electrode 2 may be formed by a transparent electrode. That is, at least one of a set having the first plate 6 and the first electrode 1, and a set having the second plate 7 and the second electrode 2 has transmittance of the light emitted by the light source 18a greater than or equal to the threshold. The first plate 6 and the second plate 7 may be formed with a material having a transmittance greater than or equal to a first threshold, and the first electrode and the second electrode may be formed with a material having a transmittance greater than or equal to a second threshold. The first threshold and the second threshold are defined, for example, in accordance with the amount of light emitted from the light source 18a. The first threshold and the second threshold may have the same value or different values.

When the first plate 6 and the second plate 7 are transparent plates formed by using the same material as that of the cover member 7c, the first electrode 1 and the second electrode 2 may be the transparent electrodes formed on the surfaces of the transparent plates. The transparent electrode is, for example, an indium tin oxide (ITO) film. Thus, use of the ITO film enables simple integration of the transparent electrode and the transparent plate. Note that the light emitted from the light source 18a is not limited to visible light. Furthermore, the integration of the first electrode 1 and the first plate 6 and the integration of the second electrode 2 and the second plate 7 can achieve a thinner capacitance detection device 20, regardless of the transmittance of the light emitted by the light sources 18a through the first electrode 1, the second electrode 2, the first plate 6, and the second plate 7.

Figure 9:
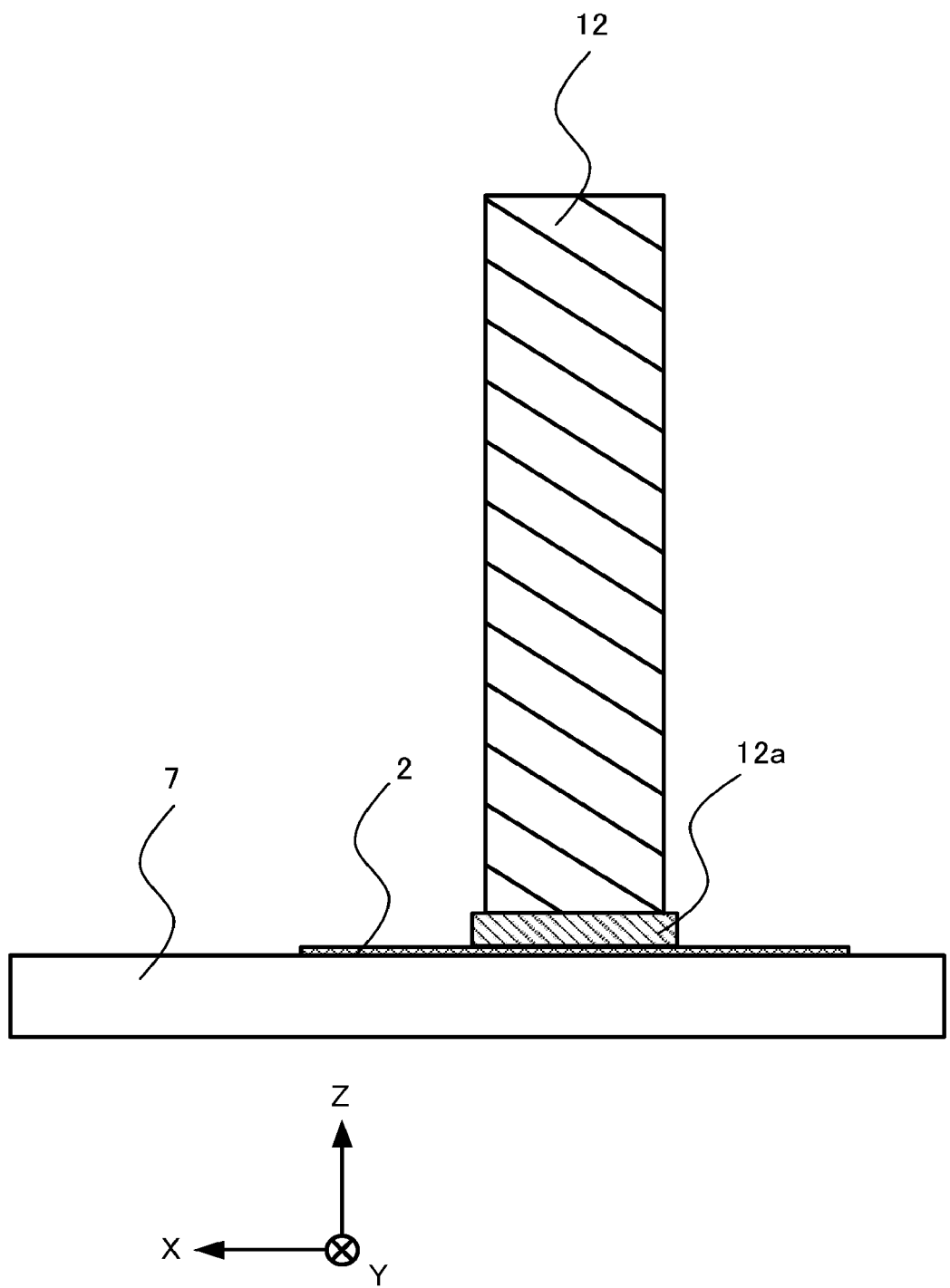
FIG. 9 is a cross-sectional view of the main section of the capacitance detection device according to Embodiment 1, taken along the conveyance direction and the electric field direction.

In the capacitance detection device 20 according to Embodiment 1, the case where the first board 11 and the first plate 6 have different coefficients of linear expansion, or the case where the second board 12 and the second plate 7 have different coefficients of linear expansion, is described with reference to FIG. 9. FIG. 9 is a cross-sectional view of the main section of the capacitance detection device, taken along the conveyance direction and the electric field direction. For example, when the first plate 6 is made using the same material as that of the cover member 7c as above-described, and when the first board 11 and the first plate 6 have greatly different coefficients of linear expansion, the difference of the coefficients of linear expansion needs to be taken into consideration. The same applies to the case in which the second board 12 and the second plate 7 have greatly different coefficients of linear expansion.

In this case, in order to maintain an electrical connection between the first board 11 and the first electrode 1 formed to a surface of the first board 11, a conductive buffering member is disposed to interconnect between the first electrode 1 and the first board 11. Similarly, in order to maintain an electrical connection between the second board 12 and the second electrode 2 formed to a surface of the second board 12, a conductive buffering member is disposed to interconnect between the second electrode 2 and the second board 12. FIG. 9 illustrates the configuration of the capacitance detection device 20 on the housing 13b side using a buffering member 12a for connection between the second electrode 2 and the second board 12. The capacitance detection device 20 on the housing 13a side also has the same configuration. The buffering member is any member as long as the member serves as a buffer. The buffering member, for example, is a conductive elastic body such as a conductive rubber, or a pin connector including a buffer spring formed of phosphor bronze sheet.

The image reading device 40 includes the capacitance detection device 20. In an example of Embodiment 1, the capacitance detection device 20 is disposed along the conveyance path 5 on the upstream side or the downstream side in the conveyance direction with respect to the image reader 14 of the image reading device 40. When a piece of transparent resin tape is attached as foreign matter on the detection object 3, since the piece of the tape is transparent with respect to transmission light and reflection light, the piece of the tape is unlikely to appear on an image such as a reflection image or a transmission image. Thus, a combination of detection of the capacitance and image reading (optical reading) is useful for identification of the detection object 3 on which the transparent resin tape adheres. Therefore, similarly to the image reading device 40 according to Embodiment 1, arrangement of the capacitance detection device 20 for detecting the capacitance and the image reader 14 for reading image next to each other in the conveyance direction enables a pair of modules to detect a capacitance image and an optical image of the detection object 3.

As described above, the image reading device 40 according to the present Embodiment 1 includes the first electrode 1 and the second electrode 2 disposed with a conveyance path 5 therebetween, the conveyance path 5 extending along the conveyance direction in which the sheet-like shaped detection object 3 is conveyed, the oscillating circuit that forms the electric field 9 between the first electrode 1 and the second electrode 2, and the detection circuit that detects the change in capacitance between the first electrode 1 and the second electrode 2. In addition, the image reading device 40 includes the first board 11 and the second board 12 to which at least one of the oscillating circuit or the detection circuit is formed. The first board 11 and the second board 12 are thin-plate shaped boards, and the main surfaces thereof extend perpendicular to the conveyance direction. Furthermore, the first electrode 1 and the second electrode 2 are disposed on the upstream side or downstream side of the conveyance path 5 in the conveyance direction with respect to the image reading position of the image reader 14 that reads the image of the detection object 3. With this configuration, the capacitance detection device 20 can be reduced in size in the conveyance direction to reliably detect the foreign matter.

Embodiment 2

Figure 10:
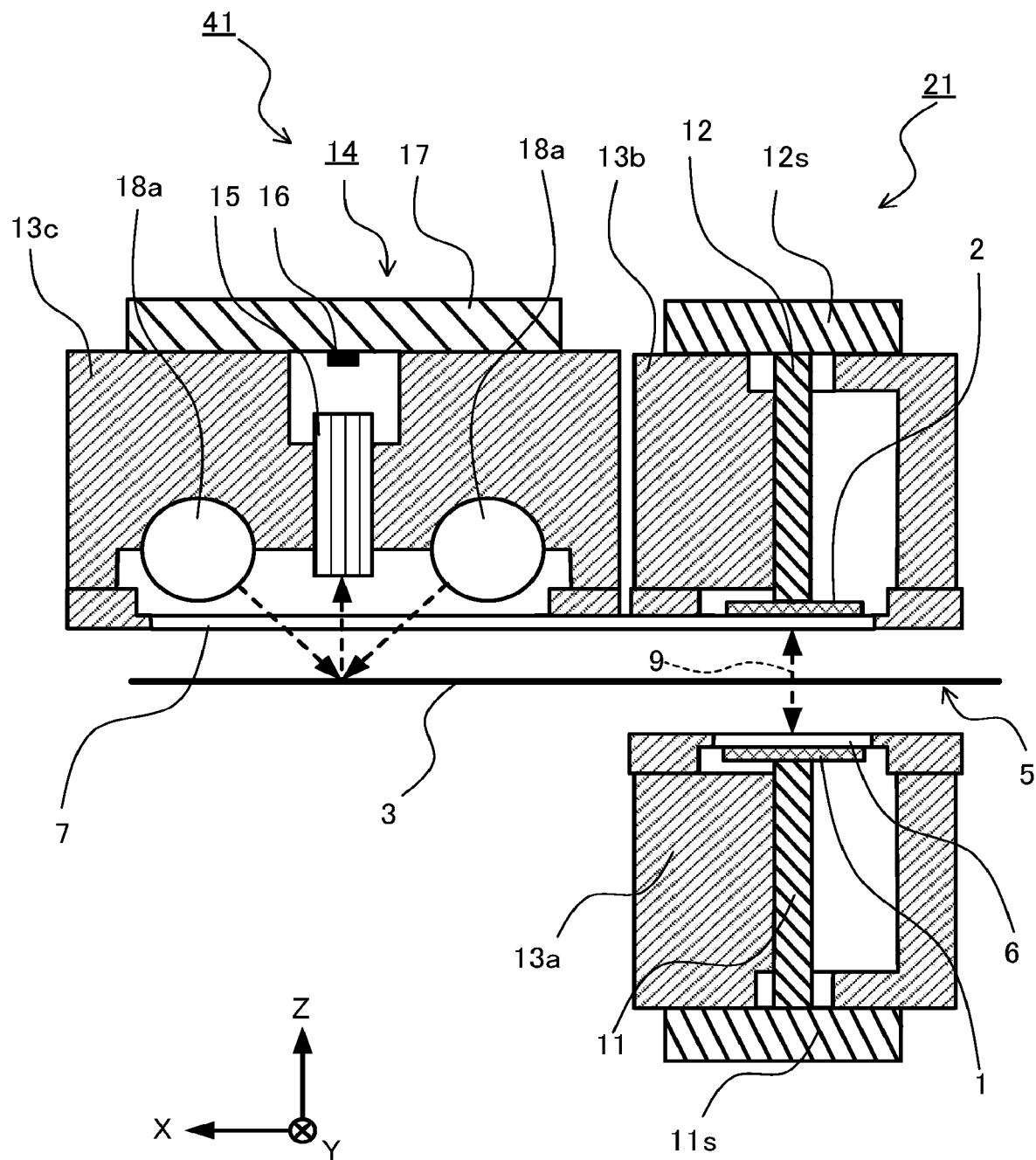
FIG. 10 is a cross-sectional view of an image reading device according to Embodiment 2 of the present disclosure, taken along the conveyance direction and the electric field direction.

Main configuration of a capacitance detection device 21 according to Embodiment 2 is described with reference to FIGS. 10 to 31. FIG. 10 is a cross-sectional view of an image reading device 41 according to the present embodiments, taken along the conveyance direction and the electric field direction. FIGS. 11 to 22 and FIGS. 25 to 28 are cross-sectional views of image reading devices 42 to 58 that are modifications of the image reading device 41 according to the present embodiment, taken along the conveyance direction and the electric field direction.

The image reading device 41 according to Embodiment 2 includes the housing 13a and the housing 13b each internally having at least one of the oscillating circuit or the detection circuit. The sensor element 16 included in the image reader 14 is provided inside the housing 13c sealed with at least one of the first plate 6 and the second plate 7. The image reader 14 reads the image of the detection object 3.

The structure of the capacitance detection device 21 is described below that is a more preferable structure in the case in which a device or sensor, of the image reading device 41, for detecting information other than information on a change in capacitance caused by the detection object 3 detects information including an image or a watermark that is printed on the detection object 3. The first plate 6 and the second plate 7 are transparent plates that are suitable as the cover member 7c with which the housing 13c of the image reading device 40 according to Embodiment 1 is sealed. The first electrode 1 and the second electrode 2 are transparent electrodes that are formed respectively to the surfaces of the first plate 6 and the second plate 7.

In the image reading device 40 including the capacitance detection device 20 according to Embodiment 1 as illustrated in FIG. 8, the cover member 7c of the housing 13c and the second plate 7 of the housing 13b are different members. As illustrated in FIG. 10, the image reading device 41 including the capacitance detection device 21 according to the present embodiment differs from the image reading device 40 according to Embodiment 1 in that the second plate 7 seals the housing 13c and is a transparent plate. The second plate 7 has a transmittance of light emitted from a light source 18a that is greater than or equal to the threshold. Note that in FIG. 10, the first plate 6 may not be transparent plate. The first plate 6 may not be a transparent, even though the first plate 6 blocks light from the light source 18a, as long as the image reader 14 does not have difficulty in performing reading. Note that the light emitted from the light source 18a is not limited to visible light.

The image reader 14 illustrated in FIGS. 10 to 31 includes at least the sensor element 16. The lens element 15 converges, via at least one of the first plate 6 or the second plate 7, the light reflected on the detection object 3 or the light transmitted through the detection object 3. The sensor element 16 receives the converged light converged by the lens element 15. Light sources 18a, 18b, and 18c emit light toward the detection object 3. The light converged by the lens element 15 is emitted from the light sources 18a and 18b onto the detection object 3 and reflected on the detection object 3, or emitted from the light sources 18b and 18c onto the detection object 3 and transmitted through the detection object 3. The light sources 18a, 18b, and 18c are disposed on a side opposite to the conveyance path 5 with respect to the first plate 6 or the second plate 7. That is, each of the light sources 18a, 18b, and 18c is installed in any one of the housings 13a, 13b, and 13c.

Figure 11:
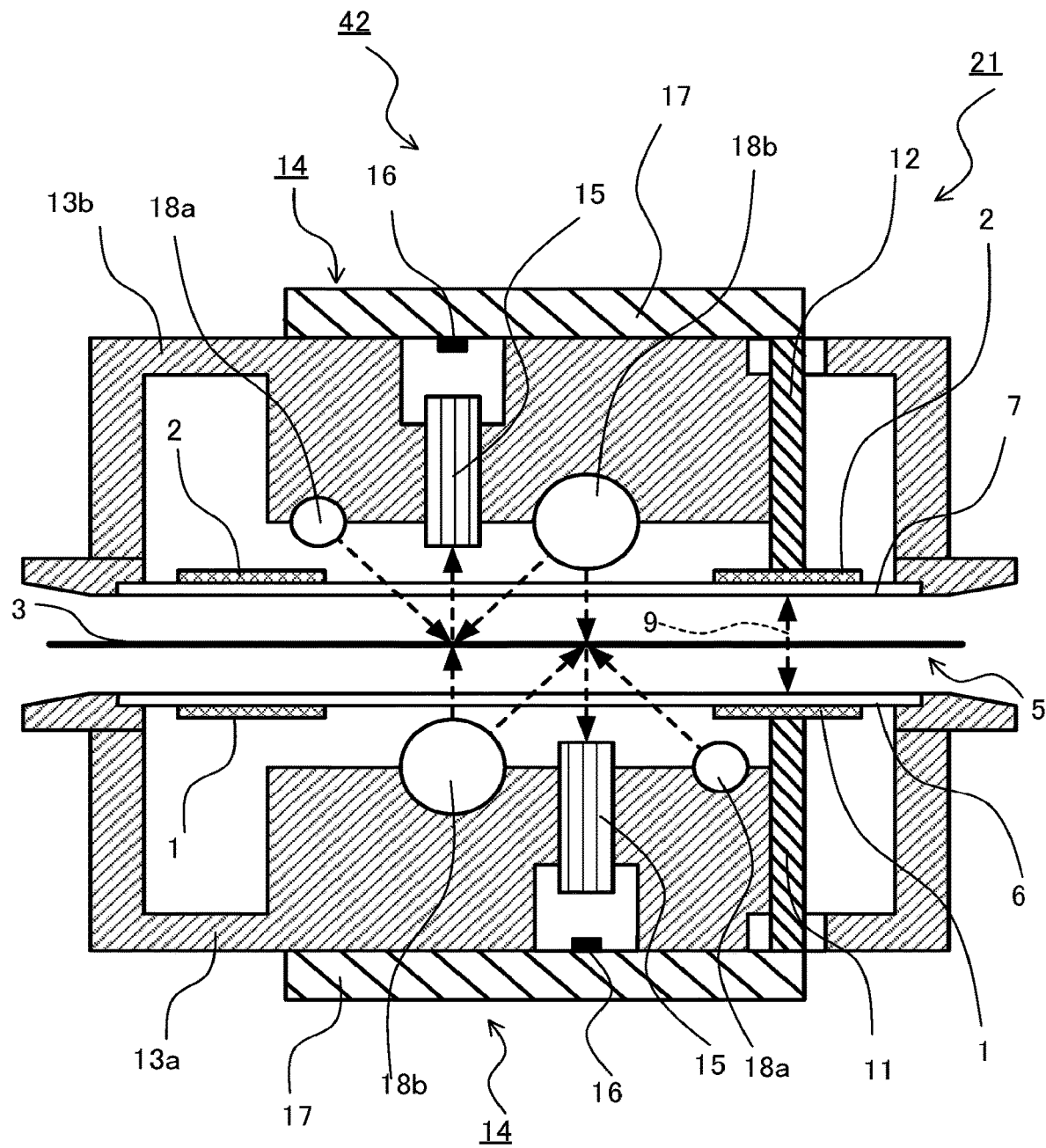
FIG. 11 is a cross-sectional view of a first modification of the image reading device according to Embodiment 2, taken along the conveyance direction and the electric field direction.

An image reading device 42 illustrated in FIG. 11 integrates of each of the housing 13a and the housing 13b of the capacitance detection device 21, and the housing 13c of the image reading device 41 illustrated in FIG. 10. Specifically, the housing 13b illustrated in FIG. 11 integrates the housing 13b and the housing 13c illustrated in FIG. 10. In addition, the housing 13b has tapered inclined ends on the upstream and downstream sides in the conveyance direction in the conveyance path 5, thereby reducing a possibility that the detection object 3 is caught at the ends during conveyance.

The external appearance of the housing 13a and the image reader 14 included in the housing 13a that are illustrated in FIG. 11 are the same as the external appearance of the housing 13b and the image reader 14 included in the housing 13b that are illustrated in FIG. 11. However, the image readers 14 are partially different in structure. Thus, the image reading device 42 illustrated in FIG. 11 can read images on both surfaces of the detection objects 3. That is, the image reading device 42 can read an image on the front surface of the detection object 3 facing the housing 13b and an image on the back surface of the detection object 3 facing the housing 13a. The housing 13a includes the light source 18a disposed on the upstream side in the conveyance direction and the light source 18b that is a light source for reflection light and transmission light on the downstream side in the conveyance direction. The housing 13b includes the light source 18b disposed on the upstream side in the conveyance direction and the light source 18a disposed on the downstream side in the conveyance direction. The light source 18b has a light guide body extending in the main-scanning direction. The light guide body included in the light source 18b has a main-scanning-direction length greater than or equal to the longitudinal-direction length or the transverse-direction length of the detection object 3.

As indicated by dashed arrows inclined relative to the optical-axis direction in FIG. 11, the detection object 3 is irradiated with light from the light source 18a and the light source 18b. As indicated by dashed arrows along the optical-axis direction in FIG. 11, this emitted light is reflected on the detection object 3, and the reflected light is transmitted through the first plate 6 or the second plate 7 that is a cover glass, and is received via the lens element 15 by the sensor element 16. As indicated by dashed arrows along the optical-axis direction in FIG. 11, the detection object 3 is irradiated with light from the light sources 18b. As indicated by dashed arrows along the optical-axis direction in FIG. 11, the emitted light is transmitted through the detection object 3, and the transmitted light is transmitted through the first plate 6 or the second plate 7, and is received via a lens element 15 by the sensor element 16. Here, the optical-axis direction is a direction perpendicular to the conveyance direction and arrangement direction.

As described in Embodiment 1, the light source 18a irradiates the detection object 3 with light in a linear pattern extending along the main-scanning direction. The light source 18a irradiates the detection object 3 with a row of light obliquely to the conveyance direction and the optical-axis direction. In contrast, the light source 18b irradiates, as illustrated in FIG. 11, the detection object 3 with two rows of light in linear patterns along the main-scanning direction. The first row of light in a linear pattern is emitted from the light source 18b obliquely to the conveyance direction and the optical-axis direction, similarly to the light emitted from the light source 18a. The second row of light in a linear pattern is emitted in parallel to the optical-axis direction. Alignment of the optical axis of the emitted light of the light source 8b and the optical axis of the lens element 15 causes the light emitted parallel to the optical-axis direction to be transmitted through the detection object 3 and received via the lens element 15 by the sensor element 16. Specifically, the optical axis of the light source 18b on the housing 13a side is aligned with the optical axis of the lens element 15 on the housing 13b side, and the optical axis of the light source 18b on the housing 13b side is aligned with the optical axis of the lens element 15 on the housing 13a side. The image reading device 42 illustrated in FIG. 11 includes the image reader 14 that can read the image of a watermark of the detection object 3.

The image reading device 42 illustrated in FIG. 11 further includes, also on the downstream side in the conveyance direction, a first electrode 1 and a second electrode 2 disposed respectively to the first plate 6 and the second plate 7, in addition to the first electrode 1 and the second electrode 2 disposed on the upstream side in the conveyance direction. Thus, the first board 11 and the second board 12 can be removed from the upstream side and inserted in the downstream side in the conveyance direction to form a capacitance detection device 21 on the downstream side in the conveyance direction. As an image reading device 43 illustrated in FIG. 12, the capacitance detection device 21 including a first board 11 and a second board 12 may also be formed on the downstream side, in addition to the capacitance detection device 21 disposed on the upstream side in the conveyance direction. Detailed description of the image reading device 43 is omitted since the difference between the image reading device 42 illustrated in FIG. 11 and the image reading device 43 illustrated in FIG. 12 is only the first board 11 and the second board 12 formed on the downstream side in the conveyance direction.

Figure 12:
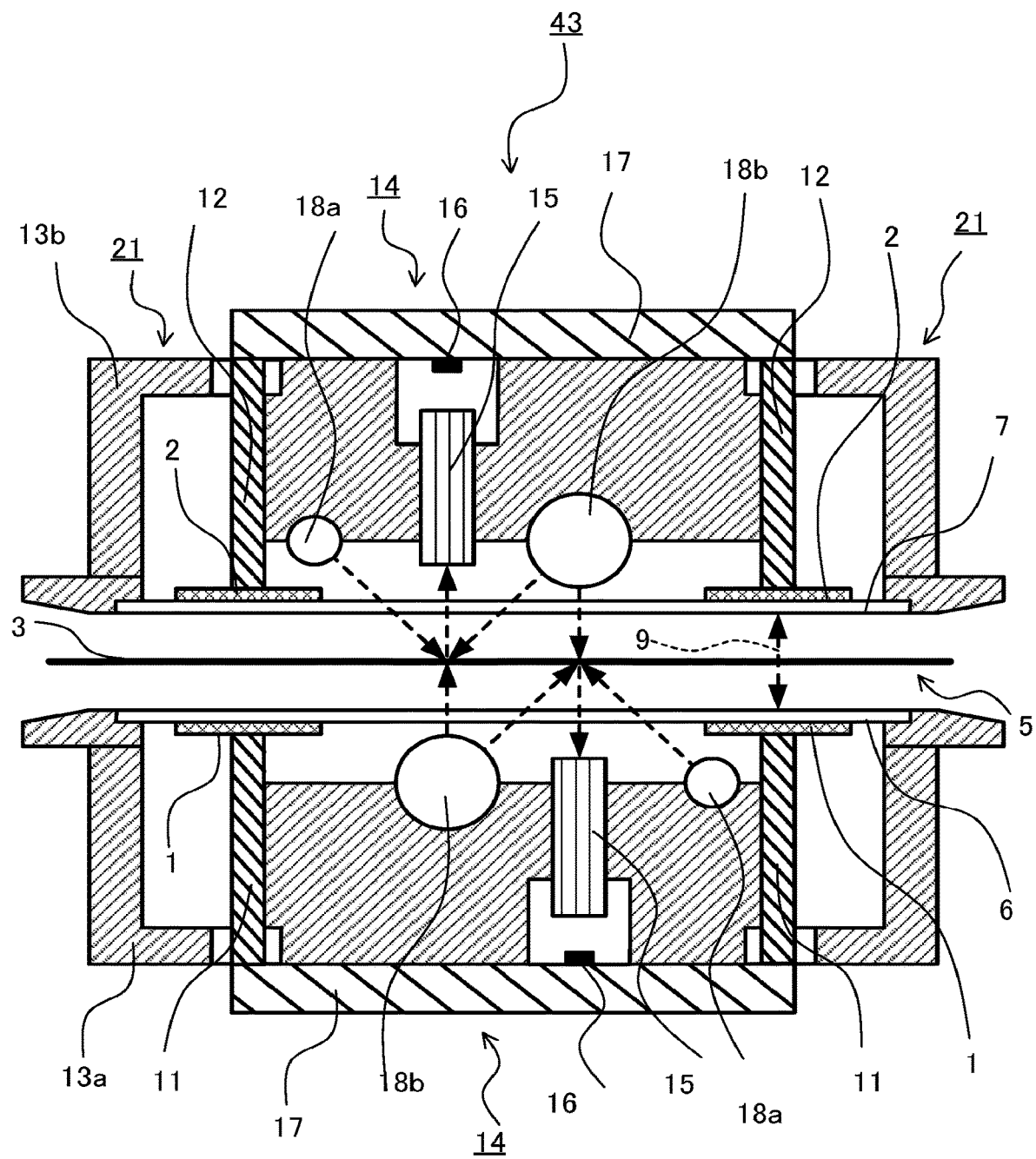
FIG. 12 is a cross-sectional view of a second modification of the image reading device according to Embodiment 2, taken along the conveyance direction and the electric field direction.

In the image reading device 43 illustrated in FIG. 12, a change in capacitance of the detection object 3 that is conveyed on the conveyance path 5 can be detected by either or both of the capacitance detection devices 21 on the upstream side and the downstream side. When a signal or image data indicating a detection value of the capacitance that is detected by either one of the capacitance detection devices 21 on the upstream side and the downstream side is passed to an upper level system, connection of a signal line may be switched between the upstream side and the downstream side.

Figure 13:
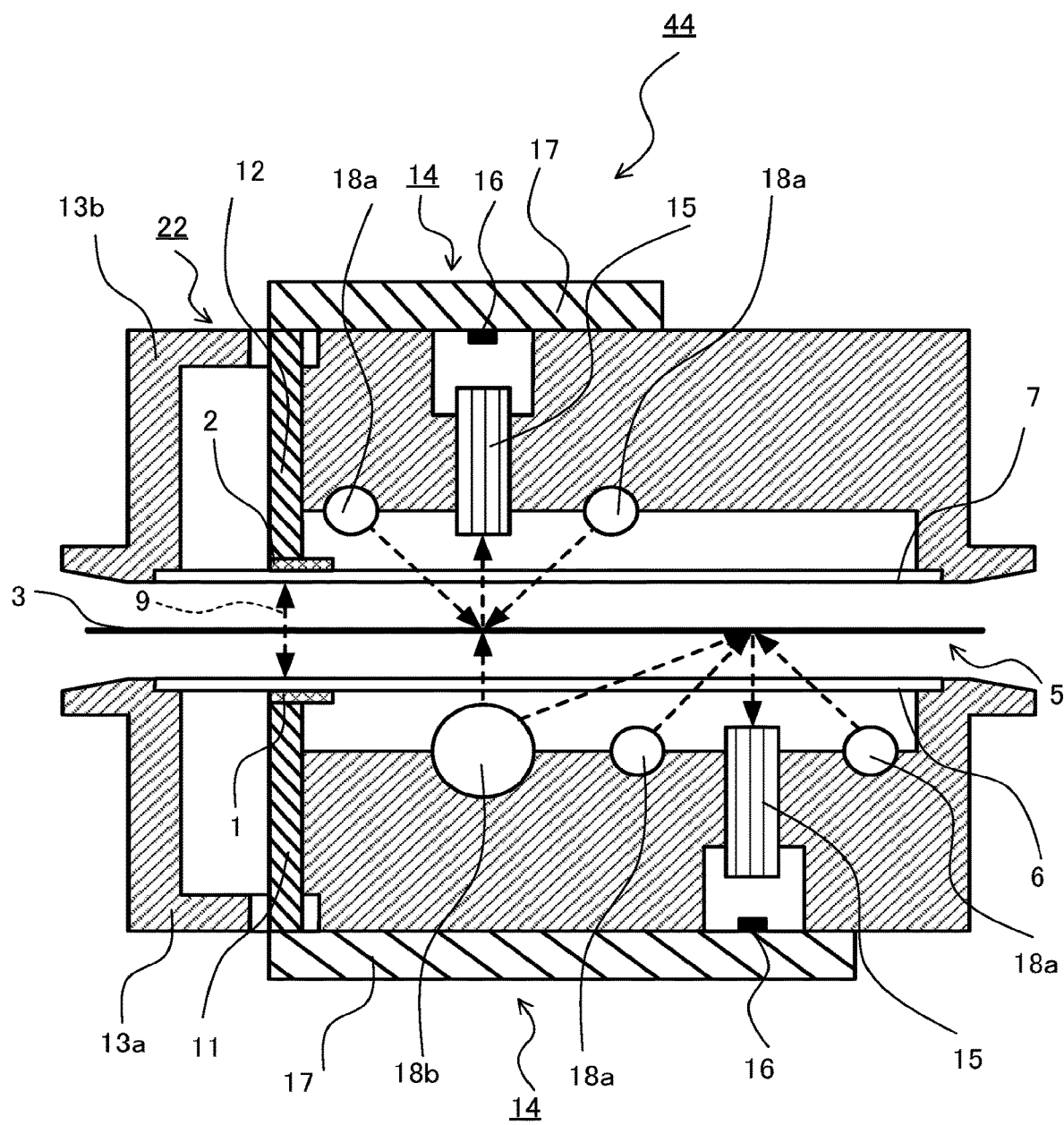
FIG. 13 is a cross-sectional view of a third modification of the image reading device according to Embodiment 2, taken along the conveyance direction and the electric field direction.

The image reading device 44 illustrated in FIG. 13 includes the light source 18b disposed only on the housing 13a side. The image reading device 44 is used when reading of an image of a watermark on the detection object 3 only by one of the image readers 14 is sufficient. The image reading device 44 may include, instead of the light source 18b, a light source 18c used in an image reading device 45 illustrated in FIG. 14. The light source 18c is a light source for irradiating with a row of light to be transmitted and includes a light guide body extending in the main-scanning direction. The light guide body included in the light source 18c has the main-scanning-direction length greater than or equal to the longitudinal-direction length or the transverse-direction length of the detection object 3. When the image reading device 44 includes the light source 18b, since the light source 18b irradiates with two rows of light, not disposing the light source 18a between the light source 18b and a lens element 15 inside the housing 13a is permissible.

In the image reading device 44 illustrated in FIG. 13, the first electrode 1 extends along the conveyance direction, and is electrically connected to the first board 11 via a connection wiring (connection electrode) at a portion, in the housing 13a, near the end of the first electrode 1 that is opposite with respect to the lens element 15. That is, the first electrode 1 is electrically connected to the first board 11 via the connection wiring at a portion of the first electrode 1 that is farther from the optical axis of the image reader 14 than the center of the first electrode 1 in the conveyance direction. Similarly, the second electrode 2 extends along the conveyance direction, and is electrically connected to the second board 12 via the connection wiring (connection electrode) at a portion, in the housing 13b, near the end of the second electrode 2 that is opposite to the lens element 15 in the housing 13b. That is, the second electrode 2 is electrically connected to the second board 12 via the connection wiring at a portion of the second electrode 2 that is farther away from the optical axis of the image reader 14 than the center of the second electrode 2 in the conveyance direction. With this configuration, the capacitance detection device 22 can be disposed closer to the image reader 14. This is achieved because arranging of the first electrode 1 closer to the image reader 14 without arranging of the first board 11 closer to the image reader 14 is easily achieved, and arranging of the second electrode 2 closer to the image reader 14 without arranging of the second board 12 closer to the image reader 14 is easily achieved. The first electrode 1 and the second electrode 2 illustrated in FIG. 14 and the subsequent figures have shapes similar to that of FIG. 13.

Figure 14:
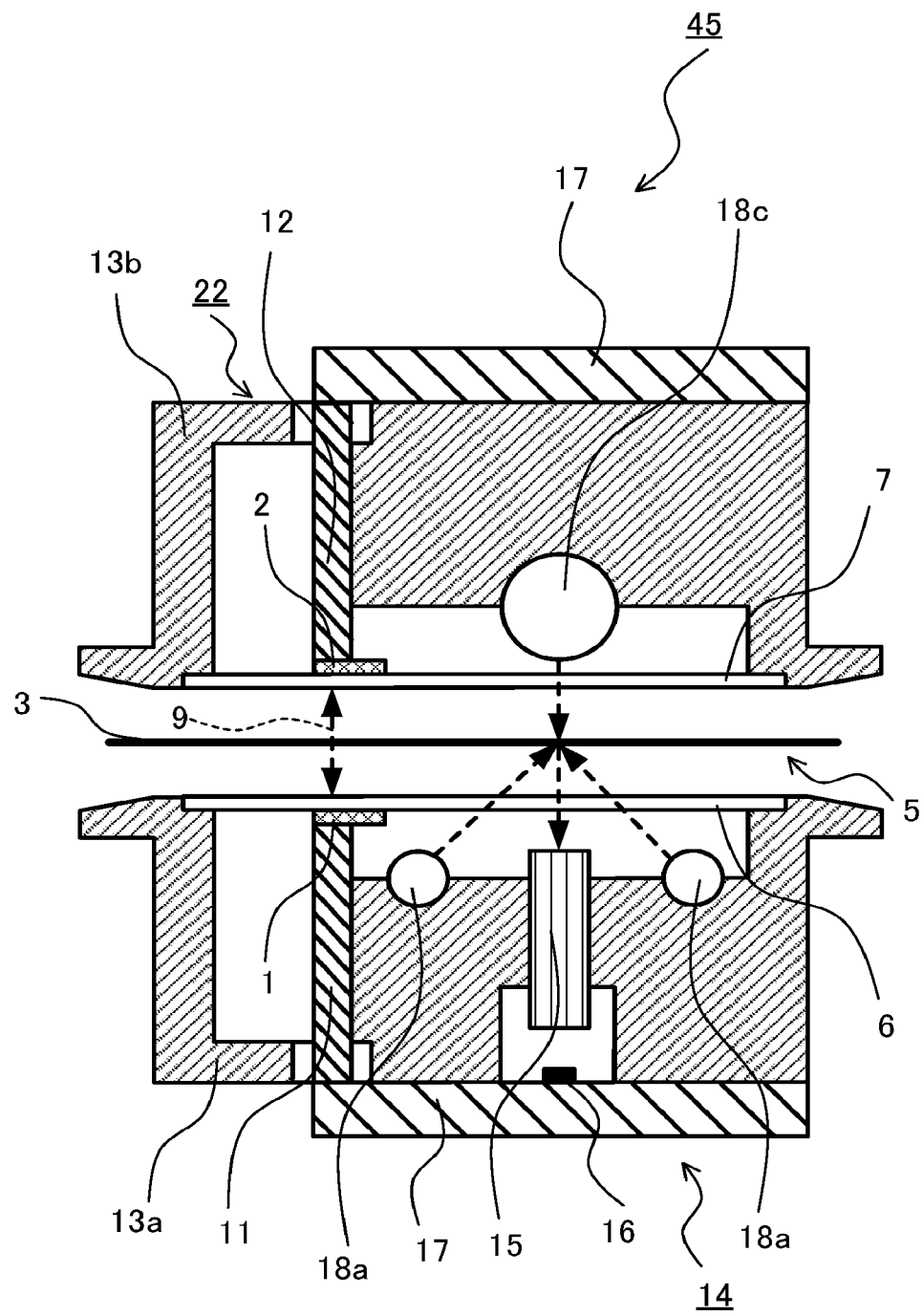
FIG. 14 is a cross-sectional view of a fourth modification of the image reading device according to Embodiment 2, taken along the conveyance direction and the electric field direction.

An image reading device 45 illustrated in FIG. 14 includes the image reader 14 provided only on the housing 13a side. The image reading device 45 is used when reading of an image of a watermark on the detection object 3 only by one of the image readers 14 is sufficient and reading of the image only on one side of the detection object 3 is sufficient. The housing 13b internally includes the light source 18c that is a light source for transmission light. The light source 18c differs from the light source 18b, and irradiates the detection object 3 with a row of light in the linear pattern along the main-scanning direction. The light source 18c emits light that is parallel with respect to the optical-axis direction. Alignment of the optical axis of the emitted light of the light source 18c and the optical axis of the lens element 15 causes the light emitted parallel with respect to the optical-axis direction to be transmitted via the second plate 7 through the detection object 3 and received via the lens element 15 by the sensor element 16. Specifically, the optical axis of the light source 18c on the housing 13b side is aligned with the optical axis of the lens element 15 on the housing 13a side. Please note that a combination of the light source 18a and the light source 18c corresponds to the light source 18b illustrated in FIG. 13.

Figure 15:
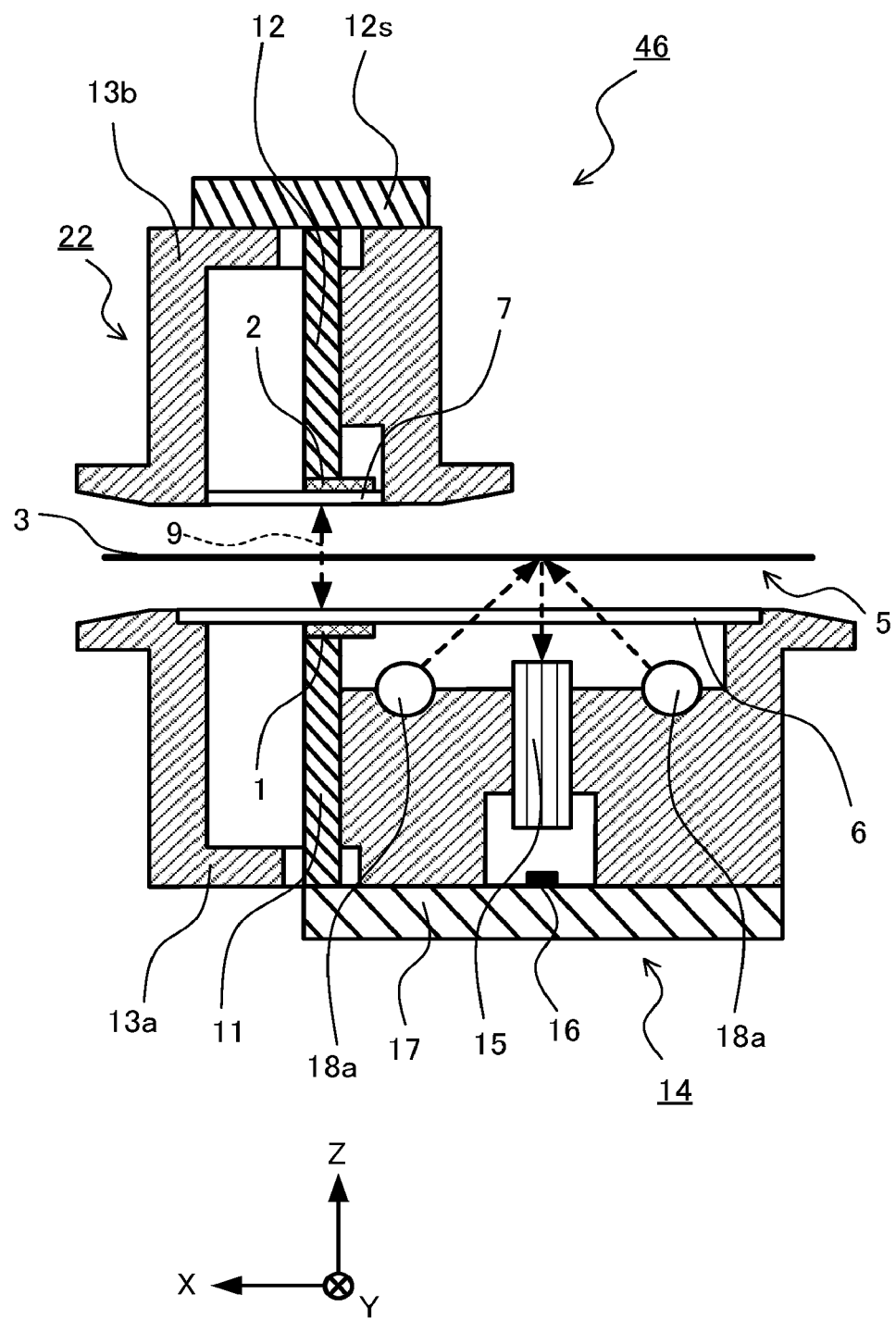
FIG. 15 is a cross-sectional view of a fifth modification of the image reading device according to Embodiment 2, taken along the conveyance direction and the electric field direction.

An image reading device 46 illustrated in FIG. 15 has a structure in which the light source 18c is omitted from the housing 13b of the image reading device 45 illustrated in FIG. 14. The image reading device 46 cannot read the image of the watermark of the detection object 3, although omission of the light source 18c enables size reduction.

Figure 16:
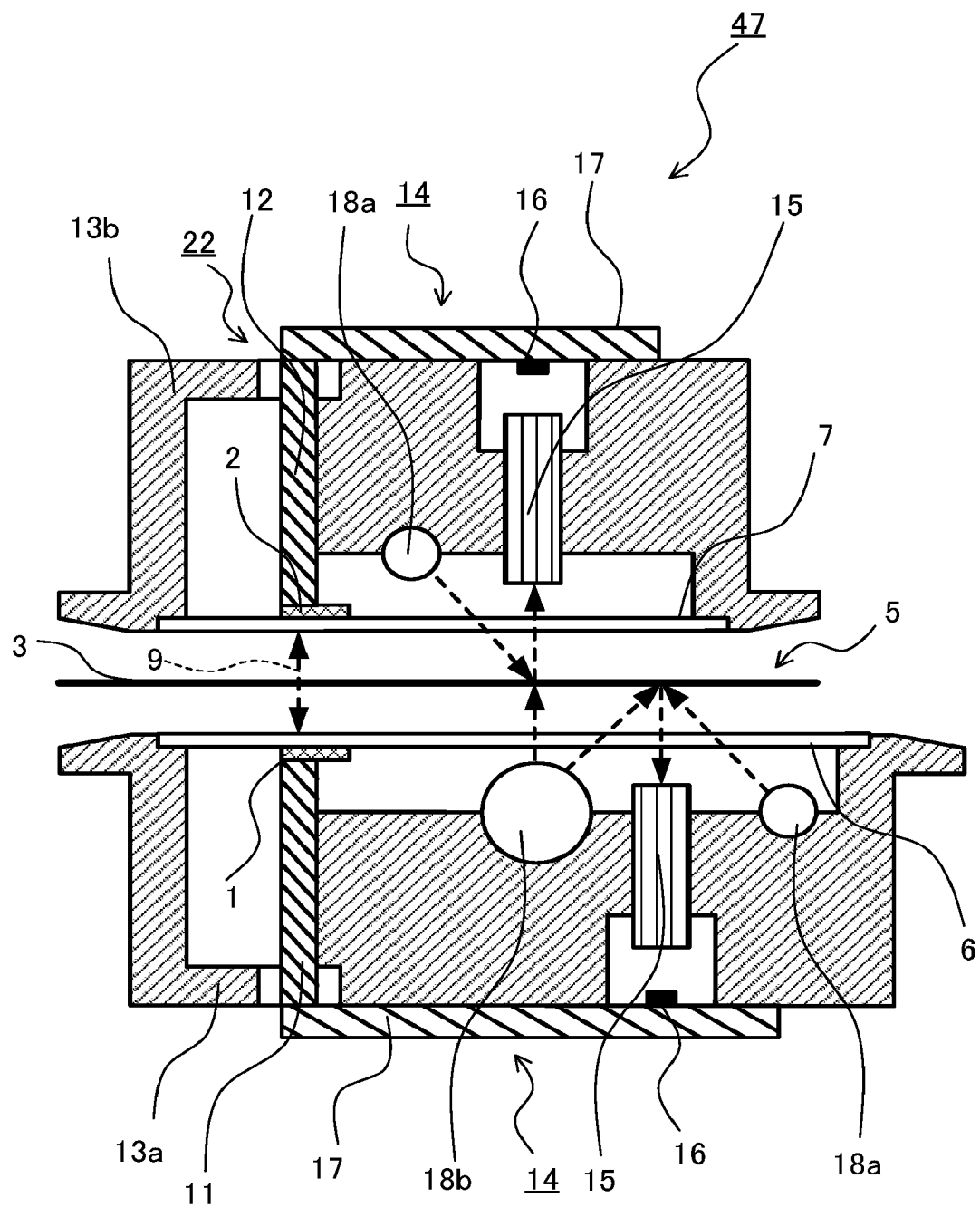
FIG. 16 is a cross-sectional view of a sixth modification of the image reading device according to Embodiment 2, taken along the conveyance direction and the electric field direction.
Figure 16:
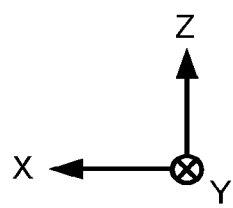

An image reading device 47 illustrated in FIG. 16 has a structure in which the light source 18a and the light source 18b on the housing 13a side of the image reading device 44 illustrated in FIG. 13 are integrated to include only the light source 18b. In addition, the image reading device 47 illustrated in FIG. 16 can have reduced size because the housing 13a and the housing 13b each contain a single light source 18a.

Figure 17:
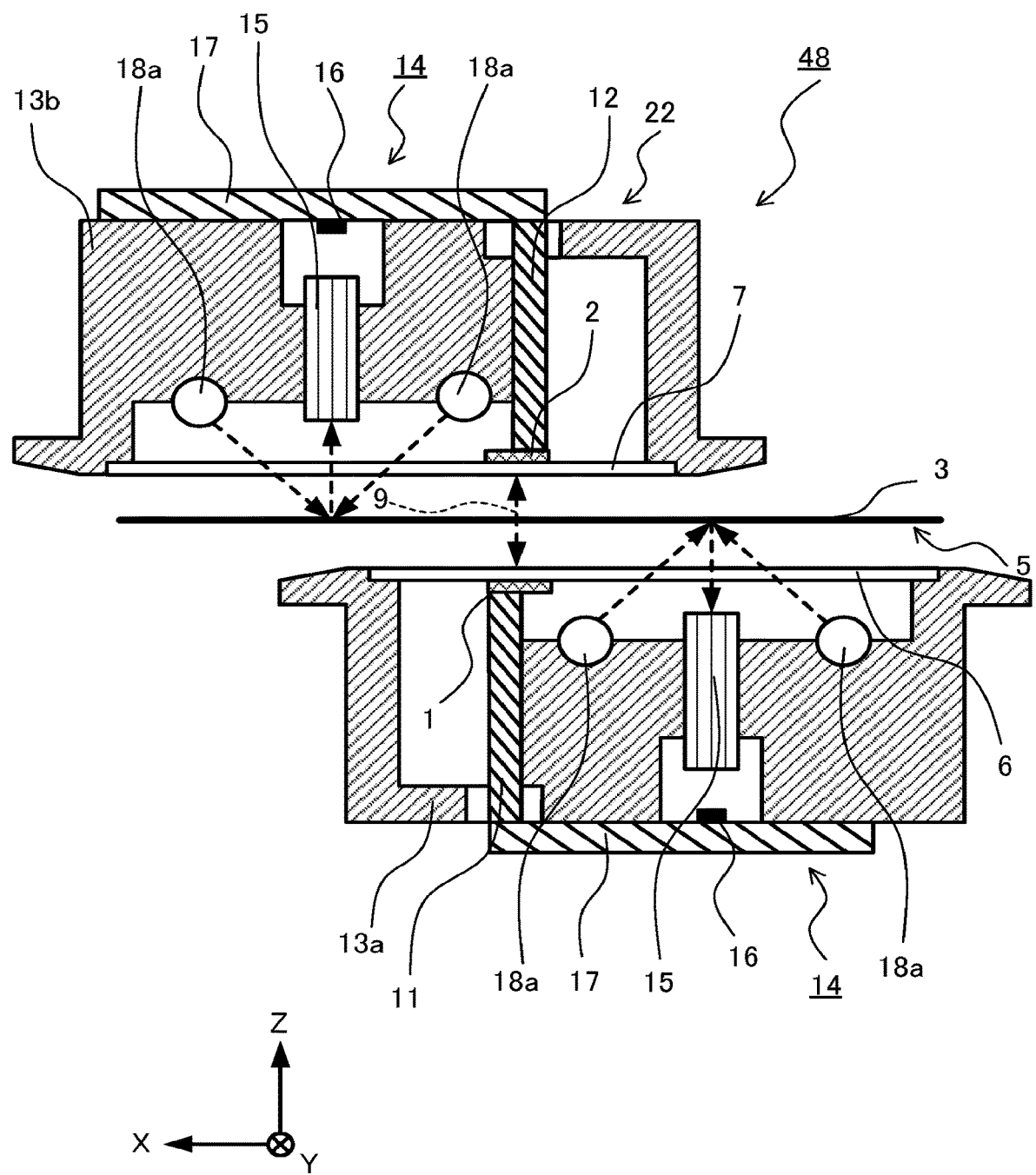
FIG. 17 is a cross-sectional view of a seventh modification of the image reading device according to Embodiment 2, taken along the conveyance direction and the electric field direction.

In an image reading device 48 illustrated in FIG. 17, the capacitance detection device 22 is disposed at a portion that is on the downstream side with respect to the image reader 14 of the housing 13a in the conveyance direction and on the upstream side with respect to the image reader 14 of the housing 13b. The first electrode 1 disposed on the housing 13a side is electrically connected to the first board 11 via the connection wiring at a portion of the first electrode 1 that is farther away from the lens element 15 inside the housing 13a than the center of the first electrode 1 in the conveyance direction. The second electrode 2 disposed on the housing 13b side is electrically connected to the second board 12 via the connection wiring at a portion of the second electrode 2 that is farther away from the lens element 15 inside the housing 13b than the center of the second electrode 2 in the conveyance direction.

In the image reading device 48 illustrated in FIG. 17, the first board 11 and the second board 12 each have the main surface parallel to a direction (Z-axis direction) perpendicular to the conveyance direction, and the first board 11 is out of line with the second board 12 in the conveyance direction. In the image reading device 48 illustrated in FIG. 17, at least one of the first board 11 or the second board 12 may serve as a light shading member that blocks light emitted by the light source 18a.

In FIGS. 8 and 10 to 16, the first board 11 and the second board 12 each have the main surface parallel to a direction (Z-axis direction) perpendicular to the conveyance direction, and the first board 11 is aligned with the second board 12 in the conveyance direction and the first board 11 is not out of line with the second board 12 in the conveyance direction. In FIGS. 8 and 10 to 16, at least one of the first board 11 or the second board 12 may serve as the light shading member that blocks the light emitted by either one of the light source 18a, the light source 18b, and the light source 18c. In FIGS. 8, 10 to 17, when at least one of the first electrode 1 or the second electrode 2 is a colored electrode, the first electrode 1 or the second electrode 2 may serve as a light shading member same as those of the first board 11 and the second board 12. In this case, the first plate 6 and the second plate 7 are not necessarily transparent at the positions corresponding to the positions of the first electrode 1 and the second electrode 2. In other words, the first electrode 1 and the second electrode 2 may be colored or colorless as long as the first plate 6 and the second plate 7 are colored at the positions corresponding to the positions of the first electrode 1 and the second electrode 2.

FIGS. 18 to 22 illustrate image reading devices 49, 50, 51, 52, and 53 in which the first electrode 1 or the second electrode 2 partially overlaps the light source 18a when viewed in the optical-axis direction. The image reading devices 49, 50, 51, 52, and 53 illustrated in FIGS. 18 to 22 do not have tapered inclined ends on the upstream and downstream sides of the housing 13a and the housing 13b in the conveyance direction. The housing 13a and the housing 13b may have tapered inclined ends on the upstream side and the downstream side in the conveyance direction.

In the image reading devices 49, 50, 51, and 52 illustrated in FIGS. 18 to 21, the second electrode 2 partially overlaps, when viewed in the optical-axis direction, the light source 18a on the downstream side of the housing 13b in the conveyance direction. In the image reading device 53 illustrated in FIG. 22, the first electrode 1 partially overlaps, when viewed in the optical-axis direction, the light source 18a on the upstream side of the housing 13a in the conveyance direction. In addition, the second electrode 2 overlaps, when viewed in the optical-axis direction, the light source 18a on the downstream side of the housing 13b in the conveyance direction.

Although, in the image reading devices 49, 50, 51, 52, and 53 illustrated in FIGS. 18 to 22, the first electrode 1 or the second electrode 2 partially overlaps the light source 18a, when the first electrode 1 or the second electrode 2 is a transparent electrode, light transmission from the light source 18a to the detection object 3 is less likely to be blocked. In contrast, the first electrode 1 or the second electrode 2 may be non-transparent when an amount of light from the light source 18a, 18b, or 18c is not reduced or a necessary amount of light is obtained. That is, the first electrode 1 or the second electrode 2 may be non-transparent as long as the first electrode 1 and the second electrode 2 are disposed avoiding the optical axis of light emitted from the light source 18a, 18b, or 18c to the detection object 3 and the optical axis of the image reader 14 (lens element 15). For example, the first electrode 1 and the second electrode 2 may be non-transparent when the first electrode 1 and the second electrode 2 are disposed without blocking the optical path from the light source 18a, 18b, or 18c to the detection object 3 and the optical path from the detection object 3 to the image reader 14. Even when the first electrode 1 or the second electrode 2 blocks light from the light source 18a, 18b, or 18c, the first electrode or the second electrode may be a non-transparent electrode as long as the image reader 14 does not have difficulty in performing reading. Note that the light is not limited to visible light.

Note that, also in the image reading devices 42, 43, and 44 illustrated in FIGS. 11, 12, and 13, although there is a distance between the first electrode 1 or the second electrode 2 and the light source 18a in the optical-axis direction, the first electrode 1 or the second electrode 2 partially overlaps the light source 18a. Also, in the image reading devices 42, 43, and 44 illustrated in FIGS. 11, 12, and 13, use of a transparent electrode as the first electrode 1 or the second electrode 2 is less likely to result in blocking of light transmission from the light source 18a to the detection object 3.

Figure 18:
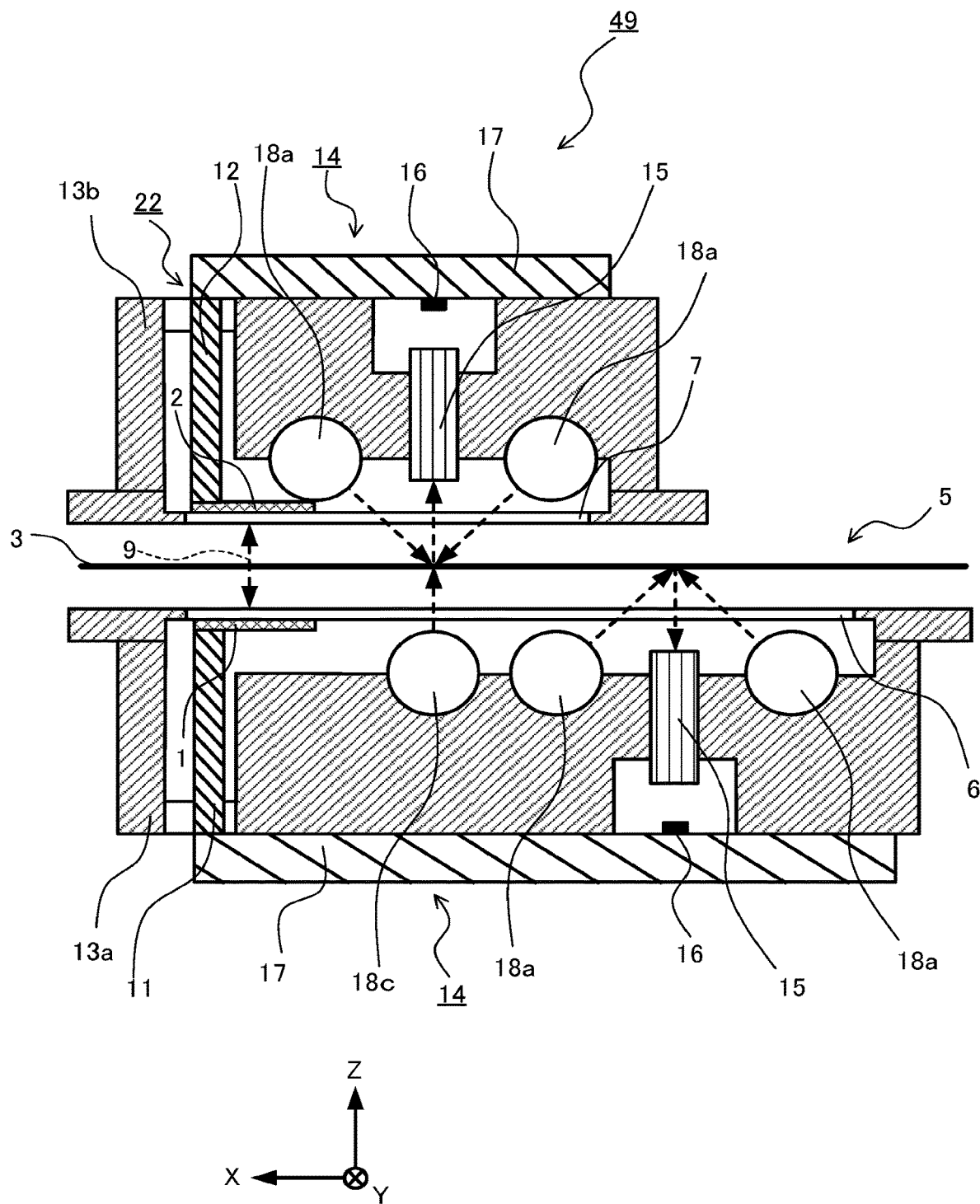
FIG. 18 is a cross-sectional view of an eighth modification of the image reading device according to Embodiment 2, taken along the conveyance direction and the electric field direction.

The image reading device 49 illustrated in FIG. 18 has a structure similar to that of the image reading device 44 illustrated in FIG. 13. The image reading device 50 illustrated in FIG. 19 has a structure similar to that of the image reading device 45 illustrated in FIG. 14, that is, the structure with the housing 13a and the housing 13b nearly inverted vertically in the optical-axis direction. The image reading device 51 illustrated in FIG. 20 has a structure similar to that of the image reading device 46 illustrated in FIG. 15, that is, the structure with the housing 13a and the housing 13b nearly inverted vertically in the optical-axis direction. The image reading device 52 illustrated in FIG. 21 has a structure similar to that of the image reading device 47 illustrated in FIG. 16. The image reading device 53 illustrated in FIG. 22 has a structure similar to that of the image reading device 48 illustrated in FIG. 17.

Figure 22:
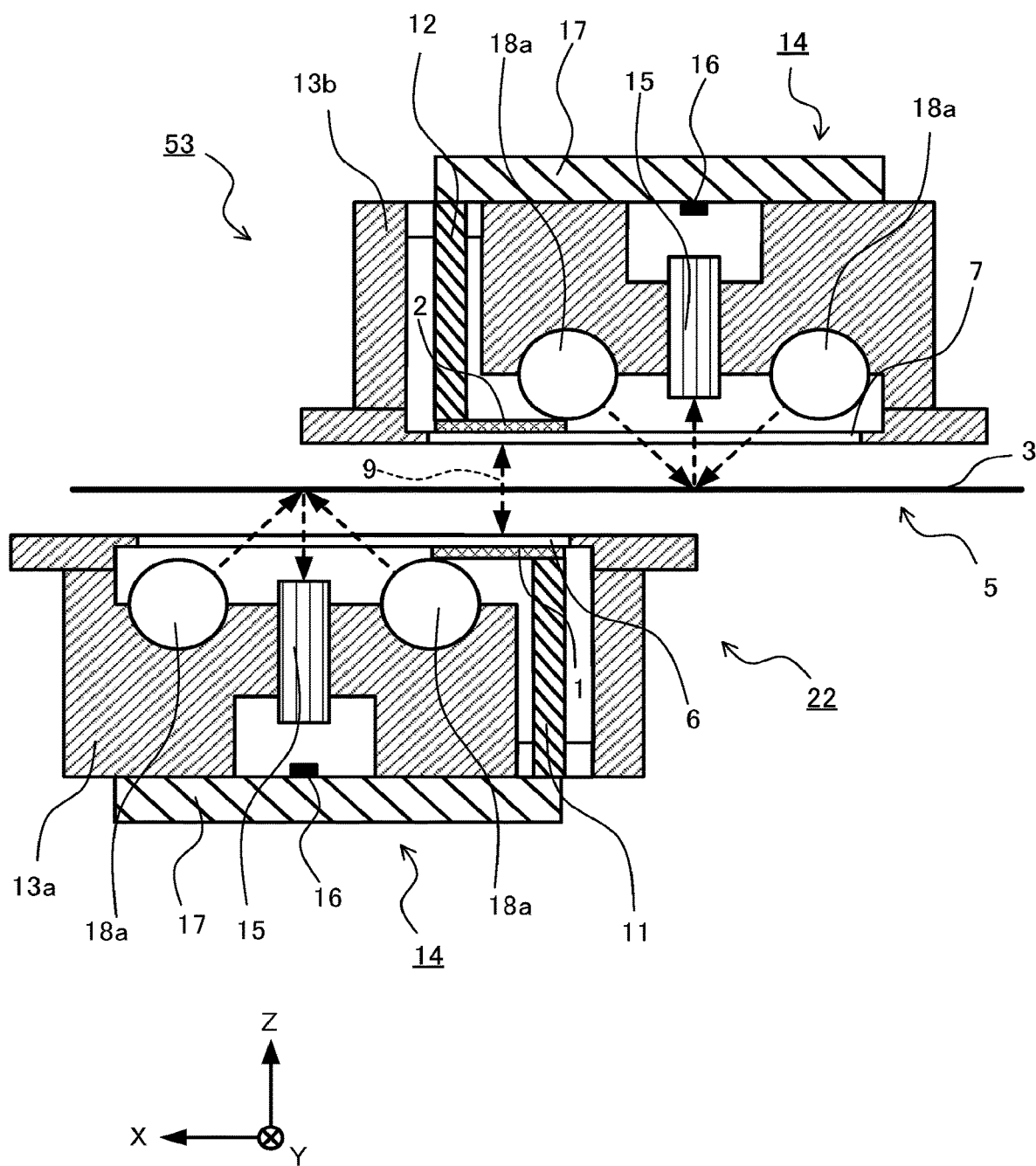
FIG. 22 is a cross-sectional view of a twelfth modification of the image reading device according to Embodiment 2, taken along the conveyance direction and the electric field direction.
Figure 24:
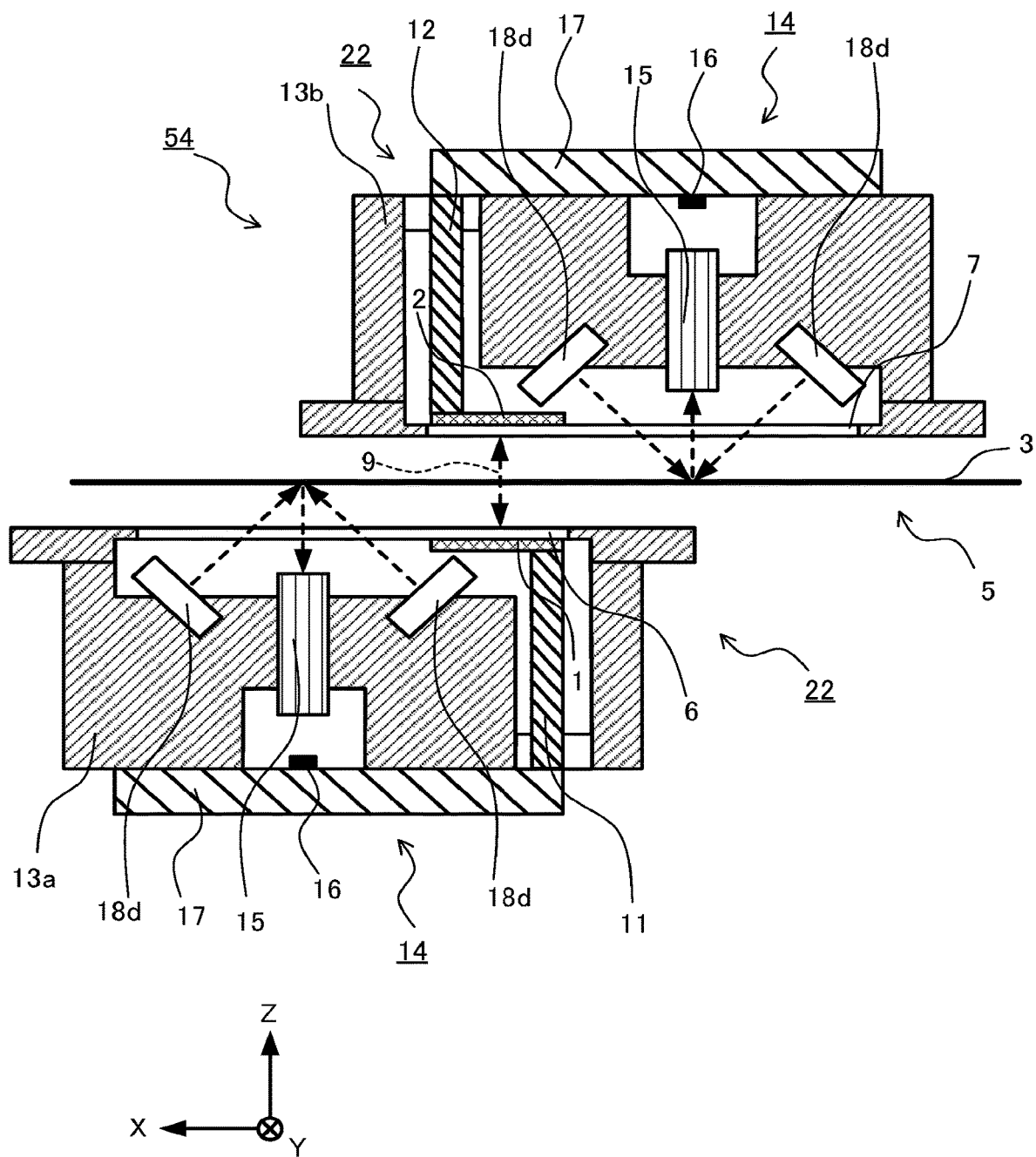
FIG. 24 is a cross-sectional view of the image reading device according to Embodiments 1 and 2, taken along the conveyance direction and the electric field direction.

In the image reading devices 53 and 54 illustrated in FIGS. 22 and 24, the first board 11 and the second board 12 each have a main surface parallel to the optical-axis direction. Note that, in FIGS. 22 and 24 the first board 11 is out of line with the second board 12 in the sub-scanning direction. Thus, the first board 11 may be out of line with the second board 12 in the sub-scanning direction. Such out-of-line arrangement in the sub-scanning direction can also be applied to the other image reading devices according to the Embodiments 1 and 2. In addition, in FIGS. 22 and 24, the board disposed parallel to the optical-axis direction may be either one of the first board 11 and the second board 12.

Figure 23:
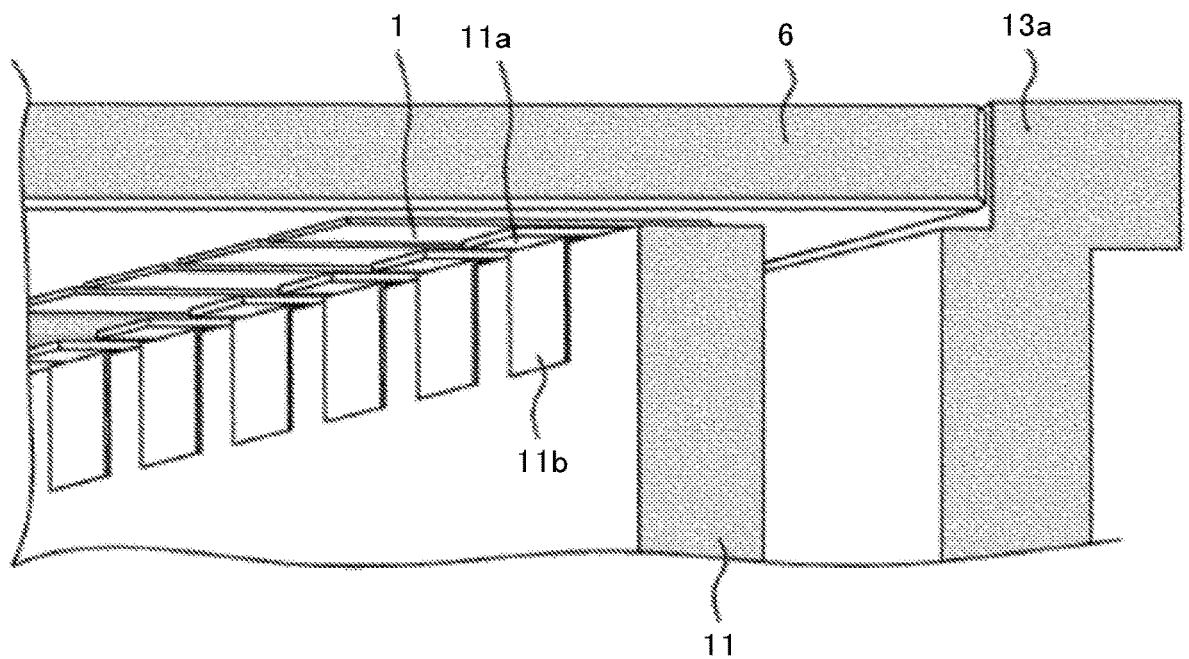
FIG. 23 is an enlarged diagram illustrating a part where a first electrode and a first board of the image reading device according to Embodiments 1 and 2 are electrically connected to each other.

An electronic connection between the first board 11 and the first electrode 1 and an electronic connection between the second board 12 and the second electrode 2 are described in detail using as an example the image reading device 53 illustrated in FIG. 22. FIG. 23 is an enlarged view illustrating the housing 13a and a portion where the first electrode 1 and the first board 11 are electrically connected to each other in the image reading device 53 illustrated in FIG. 22. In FIG. 23, illustration of a portion of the housing 13a and the light source 18a is omitted. In FIG. 23, the first board 11 has a main surface disposed parallel to the optical axis of the image reader 14. The first board 11 and the first electrode 1 are electrically connected to each other via a side surface wiring (connection wiring) 11b formed on the side surface of the first board 11 facing the first electrode 1 in the electric field direction. In an example illustrated in FIG. 23, the side surface wiring 11b extends along the main surface of the first board 11 from the side surface of the first board 11 facing the first electrode 1. As illustrated, a conductive buffering member 11a may be provided between the first electrode 1 and the side surface wiring 11b.

Similarly, the second board 12 has a main surface parallel to the optical axis of the image reader 14. The second board 12 is electrically connected to the second electrode 2 via side surface wiring formed on the side surface of the second board 12 facing the second electrode 2 in the electric field direction. In addition, a conductive buffering member may be provided between the second electrode 2 and the side surface wiring. The side surface wiring 11b is formed by a conductive pattern (side surface electrode) formed on the side surface of the first board 11. Similarly, the side surface wiring formed on the side surface of the second board 12 is a conductive pattern formed on the side surface of the second board 12. Note that the side surface of the first board 11 and the side surface of the second board 12 refer to surfaces on the conveyance path 5 side among the side surfaces of the first board 11 and the second board 12 that are parallel to the conveyance direction.

Specifically, in the image reading devices 40 to 53 according to Embodiments 1 and 2, a side surface wiring 11b is an L-shaped conductive pattern (electrode) extending from the side surface of the first board 11 to the main surface of the first board 11 that is parallel to the optical-axis direction. On the main surface of the first board 11 parallel to the optical-axis direction, the side surface wiring 11b is electrically connected to at least one of the oscillating circuit or the detection circuit. Similarly, a side surface wiring 12b is an L-shaped conductive pattern extending from the side surface of the second board 12 to the main surface of the second board 12 that is parallel to optical-axis direction. On the main surfaces of the second board 12 parallel to the optical-axis direction, the side surface wiring 12b is electrically connected to at least one of the oscillating circuit or the detection circuit.

In the image reading device 53 illustrated in FIG. 22, the first board 11 and the second board 12 each have the main surface parallel to a direction (Z-axis direction) perpendicular to the conveyance direction, and the first board 11 is out of line with the second board 12 in the conveyance direction. In the image reading device 53 illustrated in FIG. 22, at least one of the first board 11 or the second board 12 serves as the light shading member that blocks the light emitted by the light source 18a. In FIGS. 18 to 21, the first board 11 and the second board 12 each have the main surface parallel to a direction (Z-axis direction) perpendicular to the conveyance direction, and the first board 11 is in line with the second board 12 in the conveyance direction without being out of line with each other in conveyance direction. In FIGS. 18 to 21, at least one of the first board 11 or the second board 12 may serve as the light shading member that blocks the light emitted by either one of the light source 18a, the light source 18b, and the light source 18c. In FIGS. 18 to 22, when at least one of the first electrode 1 or the second electrode 2 is a colored electrode, the first electrode 1 and the second electrode 2 may include a light shading member that is the same as that of the first board 11 and the second board 12. In this case, the first plate 6 and the second plate 7 are not necessarily transparent at the positions corresponding to the positions of the first electrode 1 and the second electrode 2. In other words, the first electrode 1 and the second electrode 2 may either be colored or colorless as long as the first plate 6 and the second plate 7 are colored at the positions corresponding to the positions of the first electrode 1 and the second electrode 2.

More detailed description of FIG. 23 is provided. The first electrodes 1 extend along the conveyance direction. Each of the first electrodes 1 is electrically connected to the first board 11 via the side surface wiring 11b at a portion of the first electrode 1 that is farther away from the optical axis of the lens element 15 than the center of the first electrode 1 in the conveyance direction. Similarly, the second electrode 2 extends along the conveyance direction, and the second electrode 2 is electrically connected to the second board 12 via a side surface wiring 12b at a portion of the second electrode 2 that is farther away from the optical axis of the lens element 15 than the center of the second electrode 2 in the conveyance direction. Also in this case, the conductive buffering member 11a may be provided between the first electrode 1 and the side surface wiring 11b. Of course, the first board 11 may be electrically connected to the first electrode 1 via the side surface wiring 11b at a central portion of the first electrode 1 in the conveyance direction or at a portion of the first electrode 1 that is closer to the optical axis of the lens element 15 than the center of the first electrode 1 in the conveyance direction. Also in this case, the conductive buffering member 11a may be provided between the first electrode 1 and the side surface wiring 11b. Furthermore, the first board 11 may be electrically connected to the first electrode 1 by connection wiring without using side surface wiring 11b. The same applies to the case for second electrode 2.

In the above, the case where the light sources 18a 18b, and 18c are light guide bodies extending in the main-scanning direction in the image reading devices 40 to 53 according to Embodiments 1 and 2 is described. However, the light sources 18a 18b, and 18c are not limited to alight source having alight guide body. The image reading device 54 illustrated in FIG. 24 includes a light source 18d instead of the light source 18a of the image reading device 53 illustrated in FIG. 22. In FIG. 24, the light source 18d is a light-emitting diode (LED) array light source formed on a surface of a board extending in the main-scanning direction and including LED elements arranged in the main-scanning direction. The board included in the light source 18d has the main-scanning-direction length that is greater than or equal to the longitudinal-direction length or the transverse-direction length of the detection object 3.

Although the light source 18d illustrated in FIG. 24 is a light source for reflection light, replacement with an LED array light source is permissible for a light source used for another purpose. For example, the light source 18b that is a light source for reflection light and transmission light or the light source 18c that is a light source for transmission light source may be replaced by the LED array light source. In addition, the light sources 18a, 18b, or 18c may be formed using both the LED array light source and the light guide body. Furthermore, the light sources 18a, 18b, and 18c may be formed using the light guide body simply as a condenser lens of the light source 18d. In addition, in the image reading devices 40 to 54 according to Embodiments 1 and 2, light sources 18a, 18b, 18c, and 18d may be disposed outside the housings 13a, 13b, and 13c.

In the image reading device 54 illustrated in FIG. 24, the first board 11 and the second board 12 have the main surfaces parallel to a direction (Z-axis direction) perpendicular to the conveyance direction, and the first board 11 is out of line with the second board 12 in the conveyance direction. In the image reading device 54 illustrated in FIG. 24, at least one of the first board 11 or the second board 12 may serve as the light shading member that blocks the light emitted by the light source 18d. In FIG. 24, when at least one of the first electrode 1 or the second electrode 2 is a colored electrode, the first electrode 1 and the second electrode 2 may include a light shading member in the same manner as the first board 11 and the second board 12. In this case, the first plate 6 and the second plate 7 are not necessarily transparent at the positions corresponding to the positions of the first electrode 1 and the second electrode 2. In other words, the first electrode 1 and the second electrode 2 may be colored or colorless as long as the first plate 6 and the second plate 7 are colored at the positions corresponding to the positions of the first electrode 1 and the second electrode 2.

Figure 19:
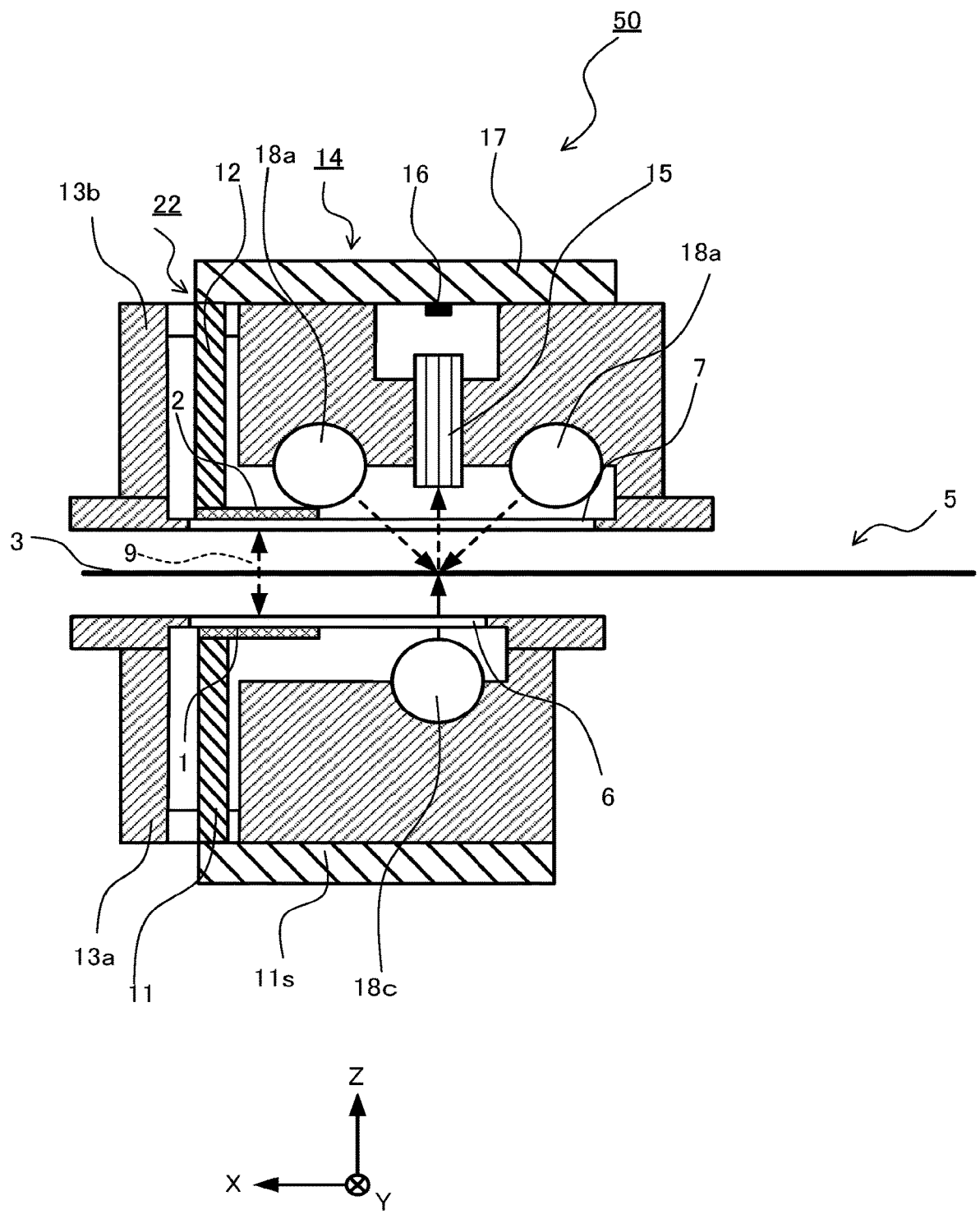
FIG. 19 is a cross-sectional view of a ninth modification of the image reading device according to Embodiment 2, taken along the conveyance direction and the electric field direction.
Figure 20:
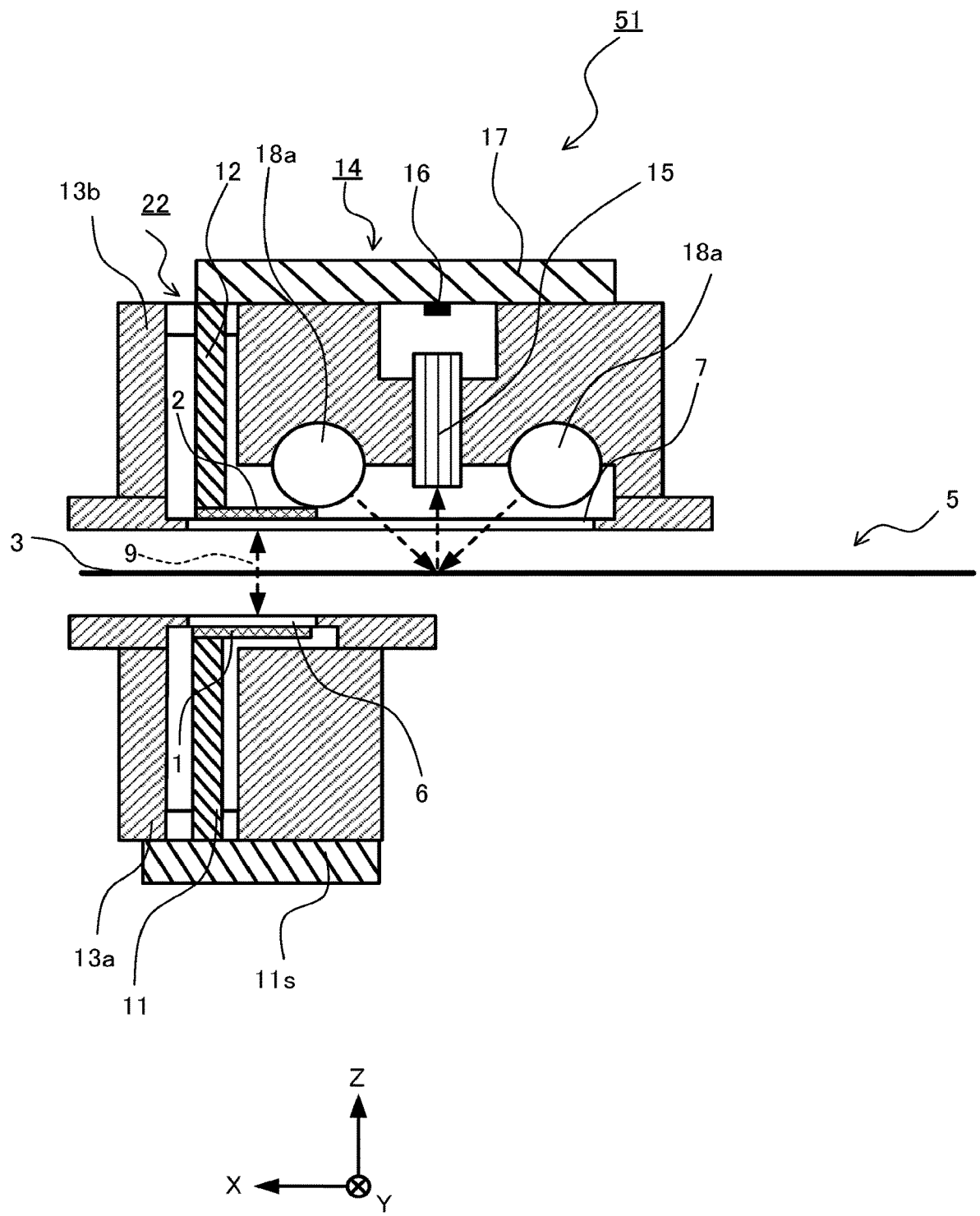
FIG. 20 is a cross-sectional view of a tenth modification of the image reading device according to Embodiment 2, taken along the conveyance direction and the electric field direction.
Figure 21:
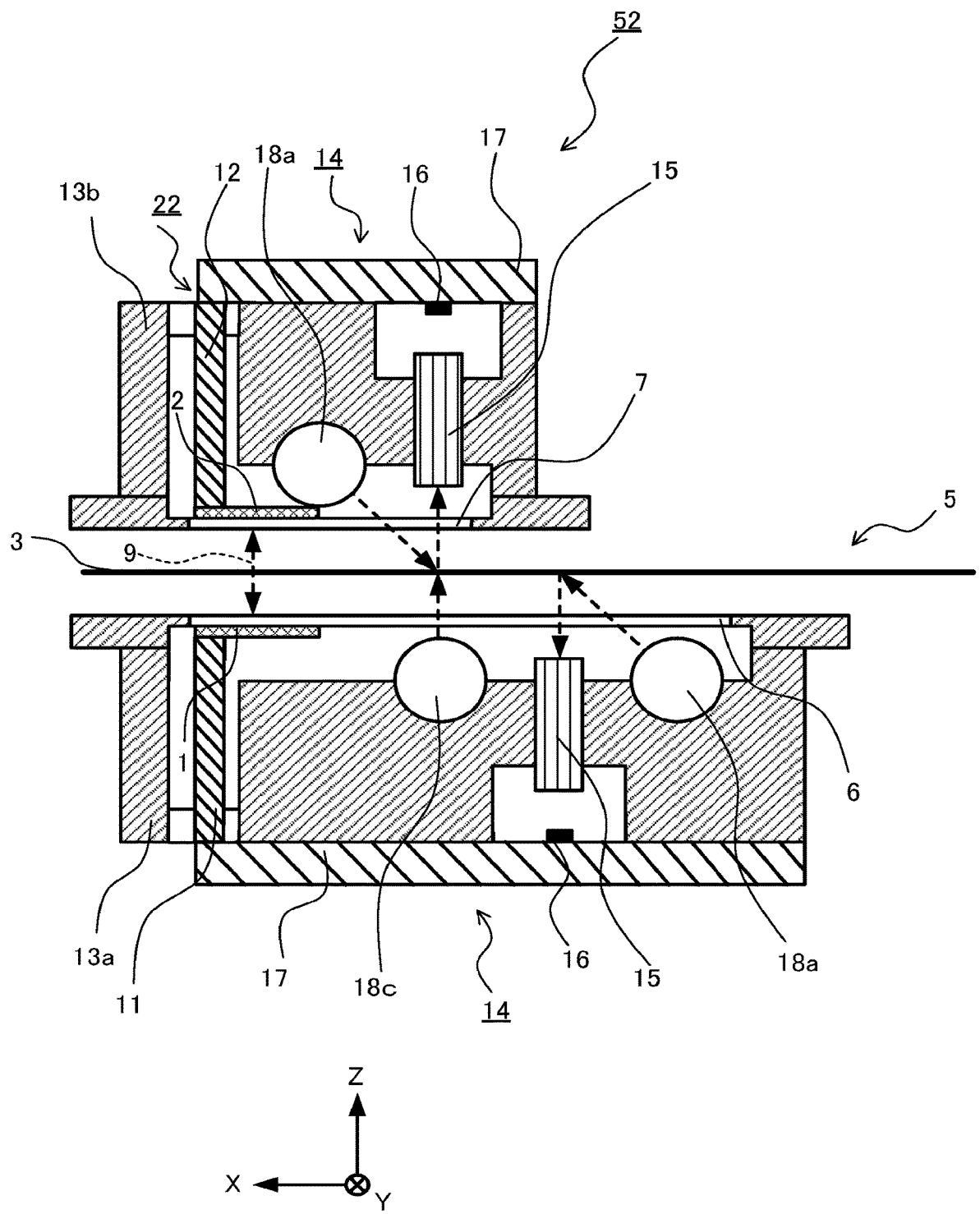
FIG. 21 is a cross-sectional view of an eleventh modification of the image reading device according to Embodiment 2, taken along the conveyance direction and the electric field direction.
Figure 25:
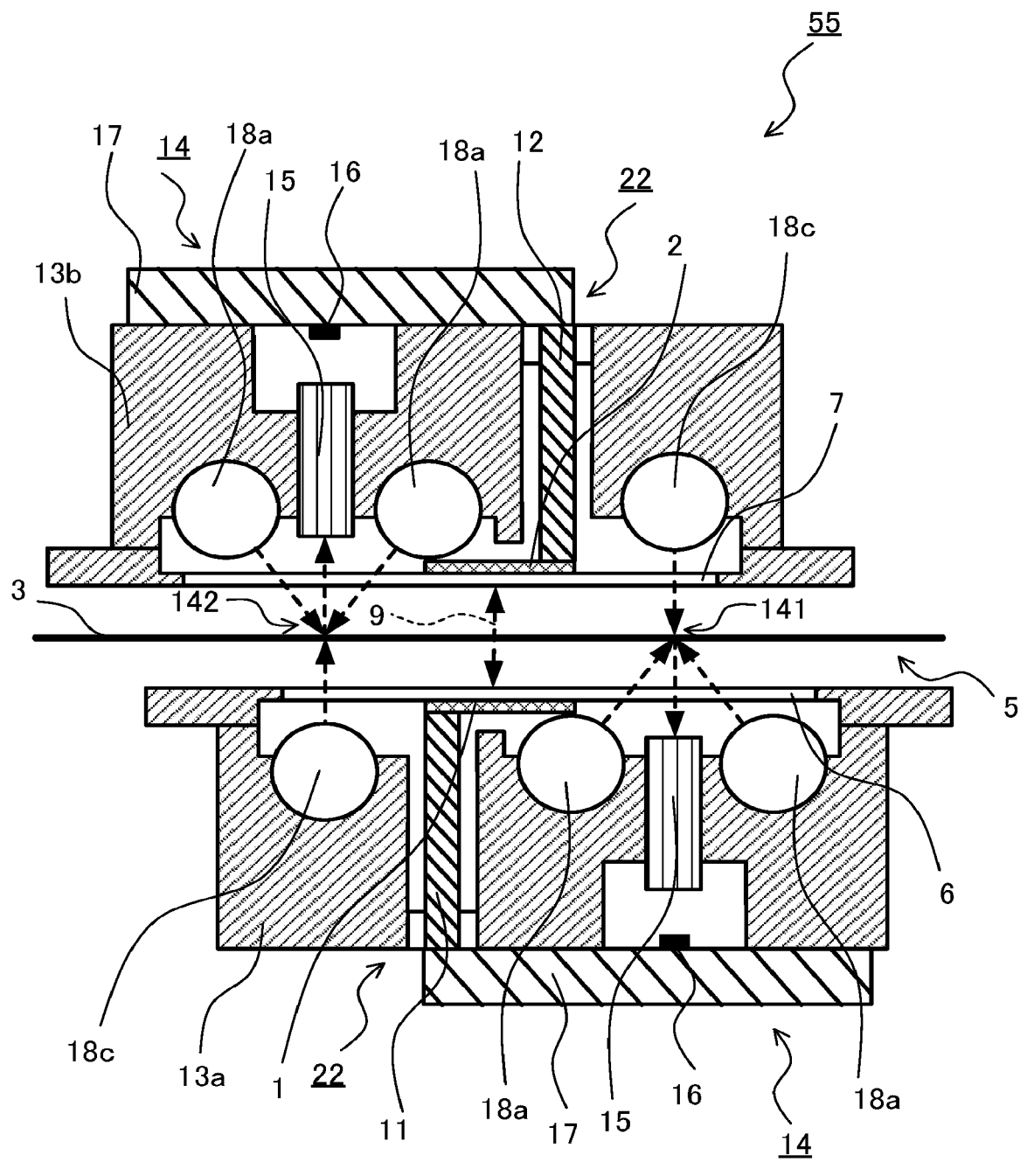
FIG. 25 is a cross-sectional view of a thirteenth modification of the image reading device according to Embodiment 2, taken along the conveyance direction and the electric field direction.
Figure 25:
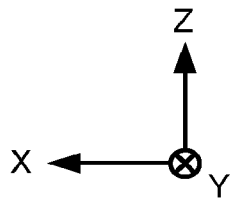

An image reading device 55 illustrated in FIG. 25 has a configuration in which the image reading device 45 illustrated in FIG. 14 is combined with the image reading device 50 illustrated in FIG. 19. Specifically, the image reading device 55 includes the image reader 14 and the light sources 18a, and 18c of the image reading device 50, except for the capacitance detection device 22 of the image reading device 50 on the downstream side of the image reading device 45 in the conveyance direction. That is, the first electrode 1 and the second electrode 2 are disposed on downstream side of the conveyance path 5 in the conveyance direction with respect to the first image reader (corresponds to the image reader 14 of the image reading device 45) that reads the image of the detection object 3 at the first reading position 141. In addition, the first electrode 1 and the second electrode 2 are disposed at the upstream side of the conveyance path 5 in the conveyance direction with respect to the second image reader (corresponds to the image reader 14 of the image reading device 50) that reads the image of the detection object 3 at the second reading position 142. Thus, the first electrode 1 and the second electrode 2 are disposed between the first reading position 141 and the second reading position 142.

In the image reading device 55 illustrated in FIG. 25, the light source 18a and the light source 18c that are disposed on the upstream of the conveyance direction with respect to the capacitance detection device 22 and irradiate the first reading position 141 are referred to as a first light source. Similarly, in the image reading device 55 illustrated in FIG. 25, the light source 18a and light source 18c that are disposed on the downstream of the conveyance direction with respect to the capacitance detection device 22 and irradiate the second reading position 142 are referred to as a second light source.

Figure 26:
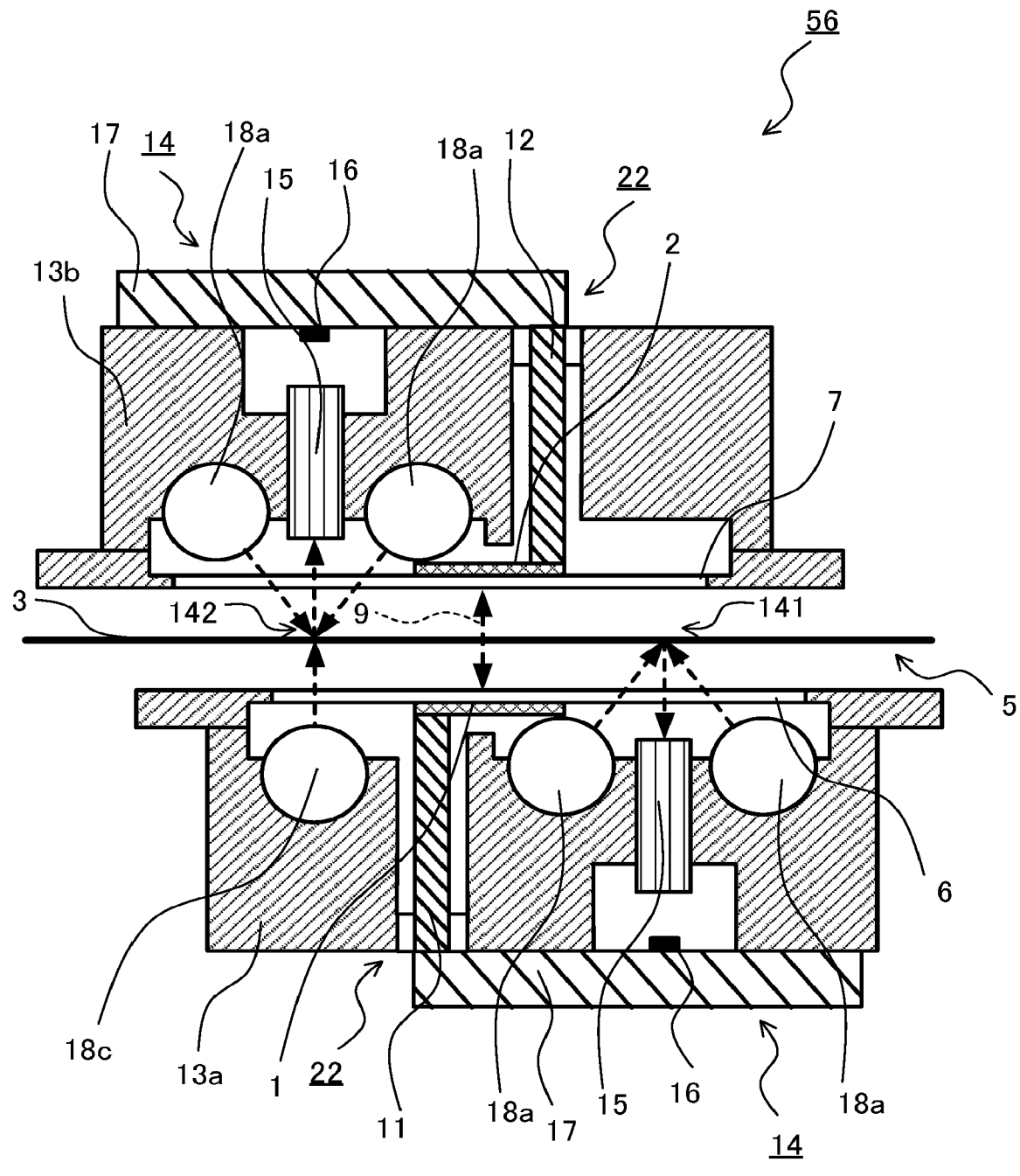
FIG. 26 is a cross-sectional view of a fourteenth modification of the image reading device according to Embodiment 2, taken along the conveyance direction and the electric field direction.
Figure 27:
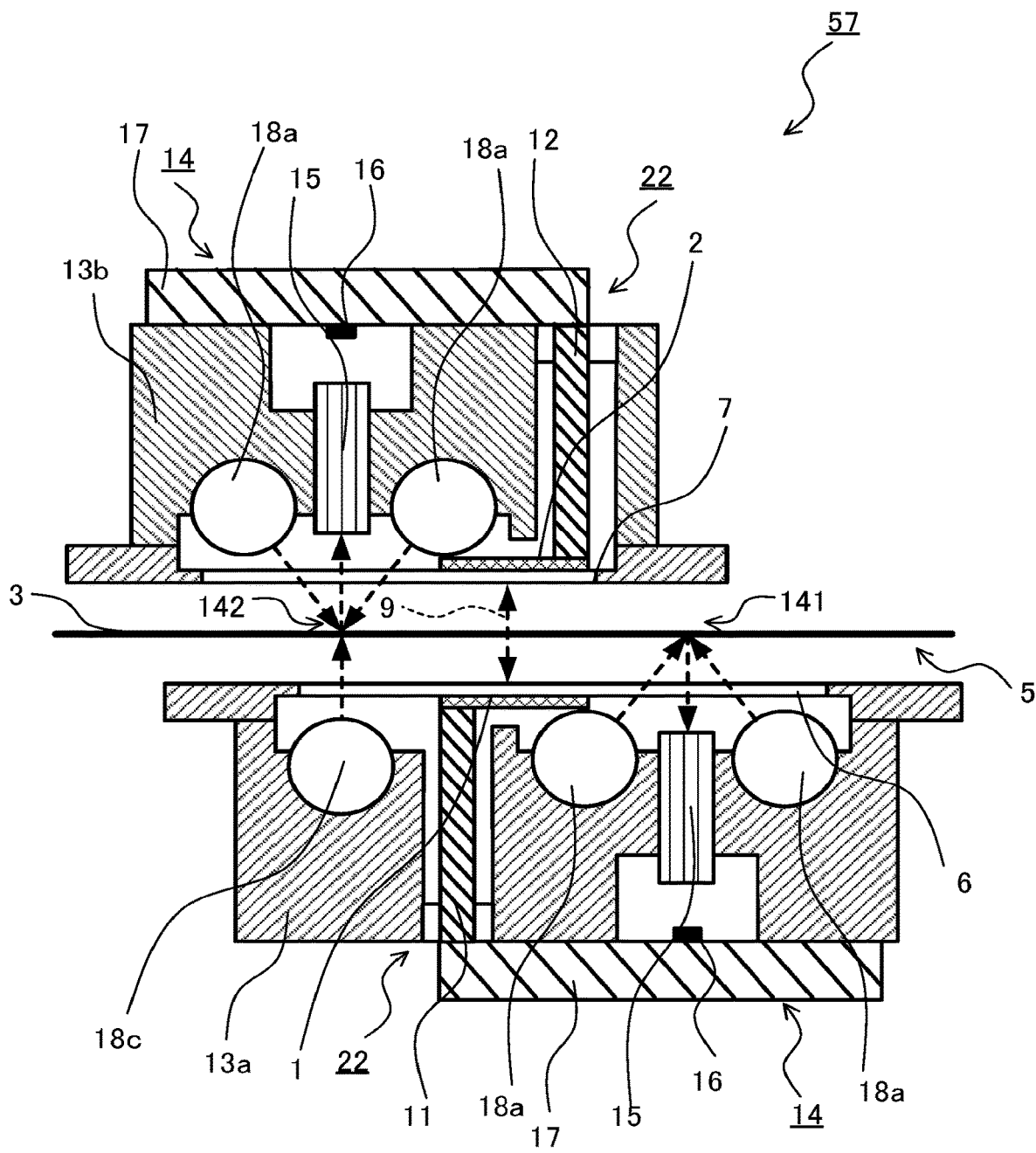
FIG. 27 is a cross-sectional view of a fifteenth modification of the image reading device according to Embodiment 2, taken along the conveyance direction and the electric field direction.

The image reading devices 56 and 57 illustrated in FIGS. 26 and 27 have a configuration in which the light source 18c that irradiates the first reading position 141 is omitted from the configuration of the image reading device 55 illustrated in FIG. 25. The light source 18a is the only first light source. The difference between the image reading device 56 and the image reading device 57 is that the housing 13b is down sized due to omission of the light source 18c from the image reading device 57. Note that in the image reading devices 55, 56, and 57 illustrated in FIGS. 25, 26, and 27, at least one of the light source 18a or the light source 18c may be a light source 18d that is an LED array light source.

In the image reading devices 55, 56, and 57 illustrated in FIGS. 25, 26 and 27, the first board 11 and the second board 12 have the main surfaces parallel to a direction (Z-axis direction) perpendicular to the conveyance direction, and the first board 11 is out of line with the second board 12 in the conveyance direction. In the image reading devices 55, 56, and 57 illustrated in FIGS. 25, 26, and 27, at least one of the first board 11 or the second board 12 may serve as the light shading member that blocks the light emitted by the light sources 18a and 18c. In FIGS. 25, 26, and 27, when at least one of the first electrode 1 or the second electrode 2 is a colored electrode, the first electrode 1 and the second electrode 2 may include a light shading member in the same manner as the first board 11 and the second board 12. In this case, the first plate 6 and the second plate 7 are not necessarily transparent at the positions corresponding to the positions of the first electrode 1 and the second electrode 2. In other words, the first electrode 1 and the second electrode 2 may be colored or colorless as long as the first plate 6 and the second plate 7 are colored at the positions corresponding to the positions of the first electrode 1 and the second electrode 2.

Specifically, in the image reading devices 55, 56, and 57 illustrated in FIGS. 25, 26, and 27, at least one of the first board 11 or the second board 12 (also including at least one of the first electrode 1 or the second electrode 2) blocks the light irradiated by the first light source (light source 18a nearer to the first board 11) toward the second reading position 142. Similarly, at least one of the first board 11 or the second board 12 (also including at least one of the first electrode 1 or the second electrode 2) blocks the light emitted by the second light source (the light source 18a near the second board 12) toward the first reading position 141.

Figure 28:
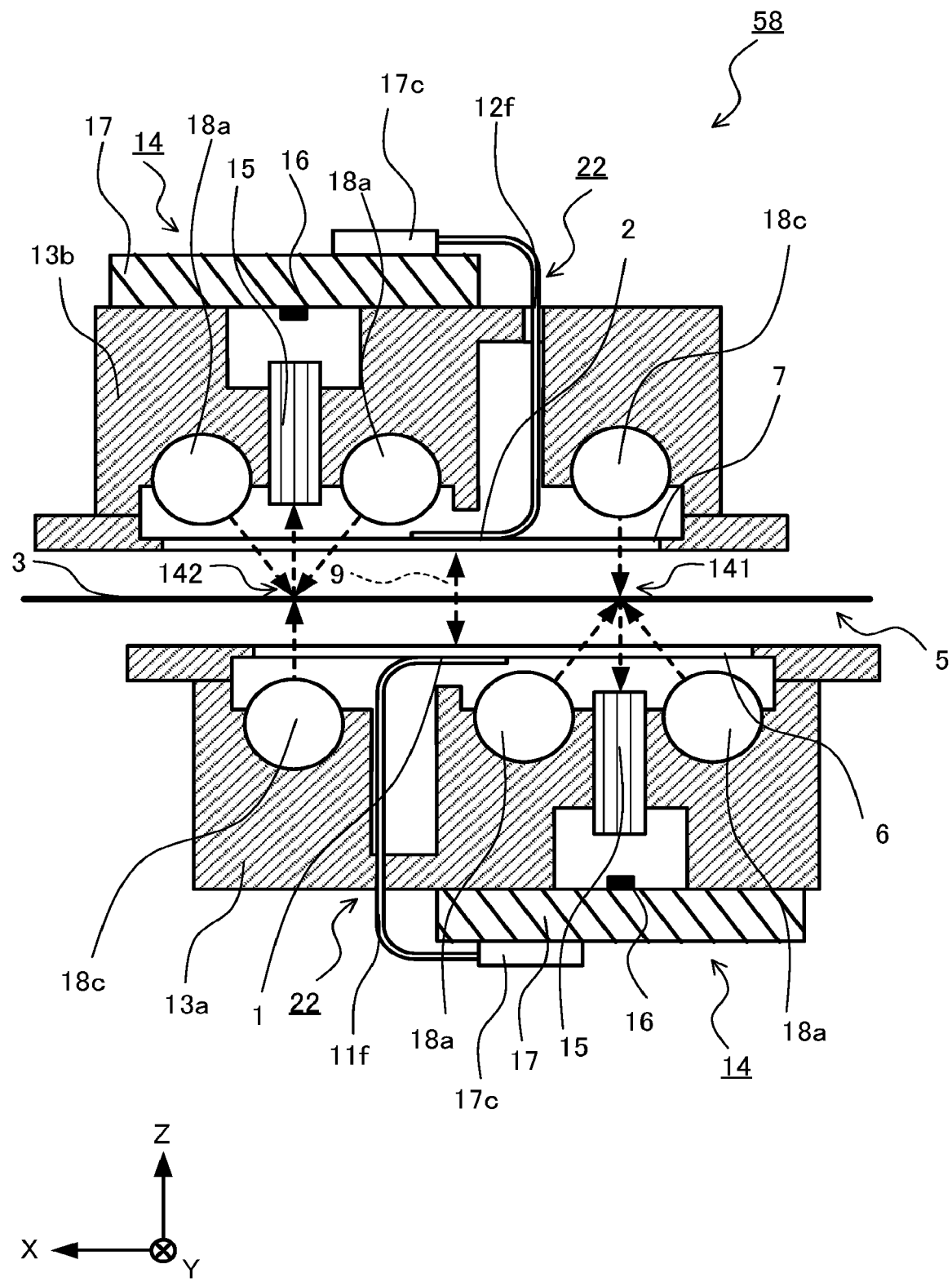
FIG. 28 is a cross-sectional view of a sixteenth modification of the image reading device according to Embodiment 2, taken along the conveyance direction and the electric field direction.

The image reading device 58 illustrated in FIG. 28 has a configuration in which the first board 11 and the second board 12 of the image reading device 55 illustrated in FIG. 25 are changed respectively to a first board 11f and a second board 12f. Other than this, the image reading device 58 has the same configuration as the image reading devices 55, 56, and 57 illustrated in FIGS. 25, 26, and 27, and the various components are exchangeable. The first board 11f and the second board 12f include a board that has flexibility, such as a flexible board. In the figures, although the first board 11 and the second board 12 are both replaced, by the first board 11f and the second board 12f, the replacement may be of just one of the boards.

The first board 11f of the image reading device 58 has the first end bent and directly or indirectly contacting the first plate 6. Alternatively, the first board 11f has the first end bent and facing the first plate 6. That is, in the first board 11f, a portion brought directly or indirectly into contact with the first plate 6 has the first electrode 1. Alternatively, in the first board 11f, a portion facing the first plate 6 has the first electrode 1, and further the first board 11f has the second end that is bent and opposite to the first end, and the first board 11f and the circuit board 17 are electrically connected to each other at the second end. For example, a connector 17c formed on the circuit board 17 and the second end of the first board 11f are electrically connected to each other. Of course, the second end of the first board 11f may be fixed to the circuit board 17 by a means such as soldering. The first board 11f has a main surface between the first end and the second end. The main surface of the first board 11f refers to a portion excluding a portion where the first electrode 1 is formed and extending along the electric field direction that is a direction in which the first electrode 1 and the second electrode 2 at least partially face each other.

The second board 12f of the image reading device 58 has the first end bent and directly or indirectly contacting the second plate 7. Alternatively, the second board 12f has the first end bent and facing the second plate 7. That is, in the second board 12f, a portion brought directly or indirectly into contact with the second plate 7 has the second electrode 2. Alternatively, in the second board 12f, a portion facing the second plate 7 has the second electrode 2, and further, the second board 12f has the second end that is bent and opposite to the first end, and the second board 12f and a circuit board or the circuit board 17 are electrically connected to each other at the second end. For example, a connector 17c formed on the circuit board 17 and the second end of the second board 12f are electrically connected to each other. Of course, the second end of the second board 12f may be fixed to the circuit board or the circuit board 17 by a means such as soldering. The second board 12f has a main surface between the first end and the second end. The main surface of the second board 12f refers to a portion excluding a portion where the second electrode 2 is formed and extending along the electric field direction that is a direction in which the first electrode 1 and the second electrode 2 at least partially face each other.

In the image reading device 58 illustrated in FIG. 28, the first board 11f and the second board 12f have the main surfaces parallel to a direction (Z-axis direction) perpendicular to the conveyance direction, and the first board 11f is out of line with the second board 12f in the conveyance direction. In the image reading device 58 illustrated in FIG. 28, at least one of the first board 11f or the second board 12f may serve as the light shading member that blocks the light emitted by the light source 18a and the light source 18c. In FIG. 28, the first electrode 1 and the second electrode 2 may include a light shading member that are the same as those of the first board 11f and the second board 12f. In this case, the first plate 6 and the second plate 7 are not necessarily transparent at the positions corresponding to the positions of the first electrode 1 and the second electrode 2. In other words, the first electrode 1 and the second electrode 2 may be colored or colorless, as long as the first plate 6 and the second plate 7 are colored at the positions corresponding to the positions of the first electrode 1 and the second electrode 2.

In the image reading device 58 illustrated in FIG. 28, specifically, at least one of the first board 11f or the second board 12f (also including at least one of the first electrode 1 or the second electrode 2) blocks the light irradiated by the first light source (light source 18a nearer to the first board 11) toward the second reading position 142. Similarly, at least one of the first board 11f or the second board 12f (including at least some of the first electrode 1 and the second electrode 2) blocks the light irradiated by the second light source (the light source 18a near the second board 12) toward the first reading position 141.

Figure 29:
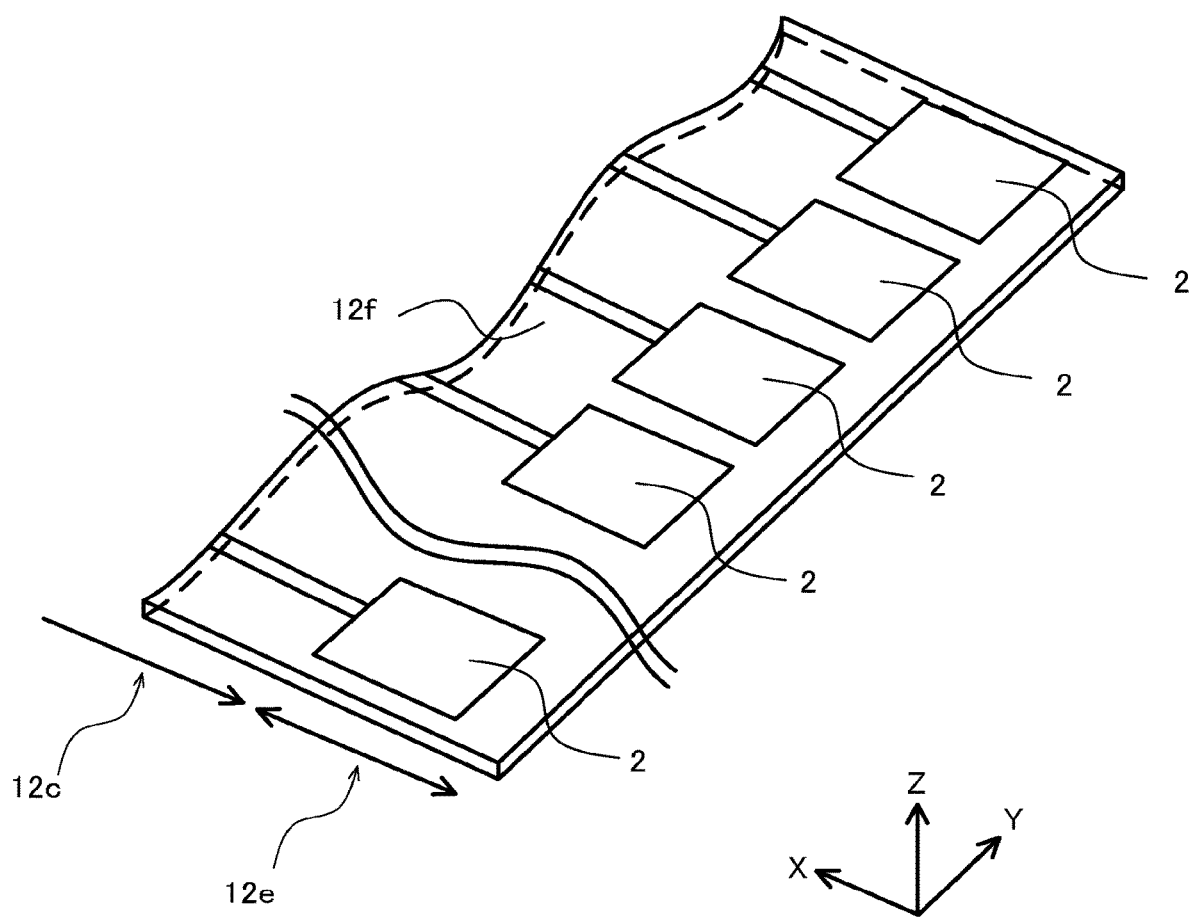
FIG. 29 is a perspective view of the main section of a capacitance detection device according to Embodiment 2.
Figure 30:
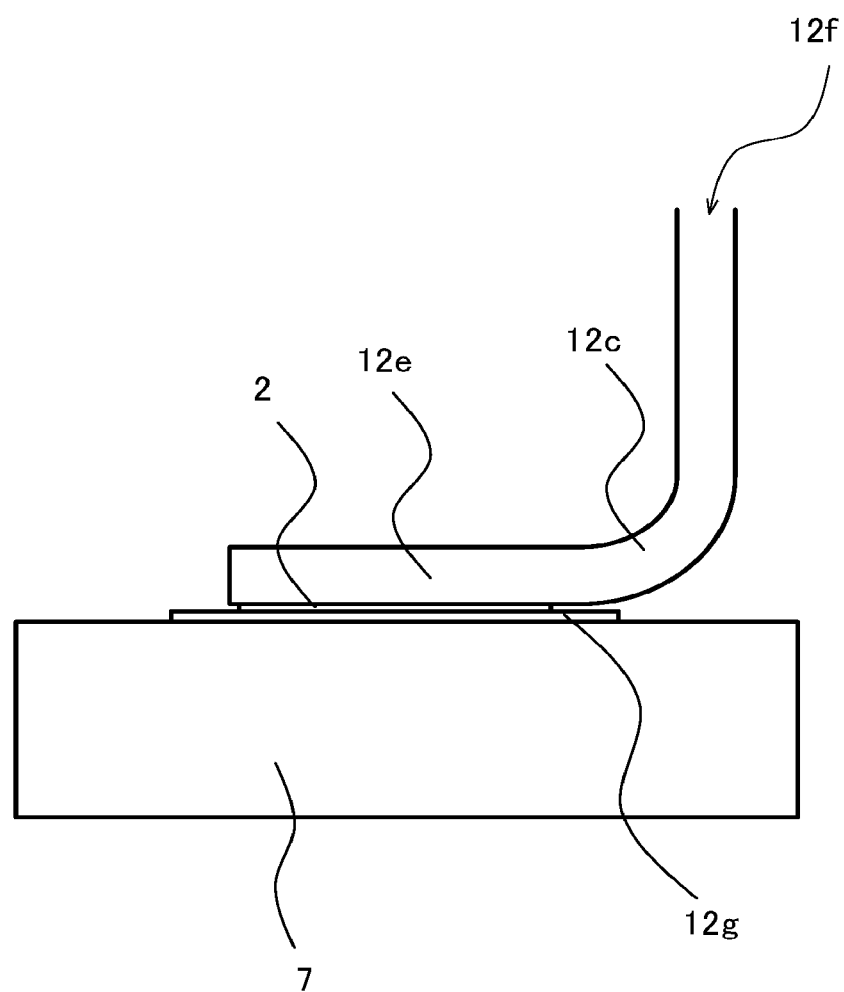
FIG. 30 is a diagram indicating connection of the main section of the capacitance detection device according to Embodiment 2.
Figure 31:
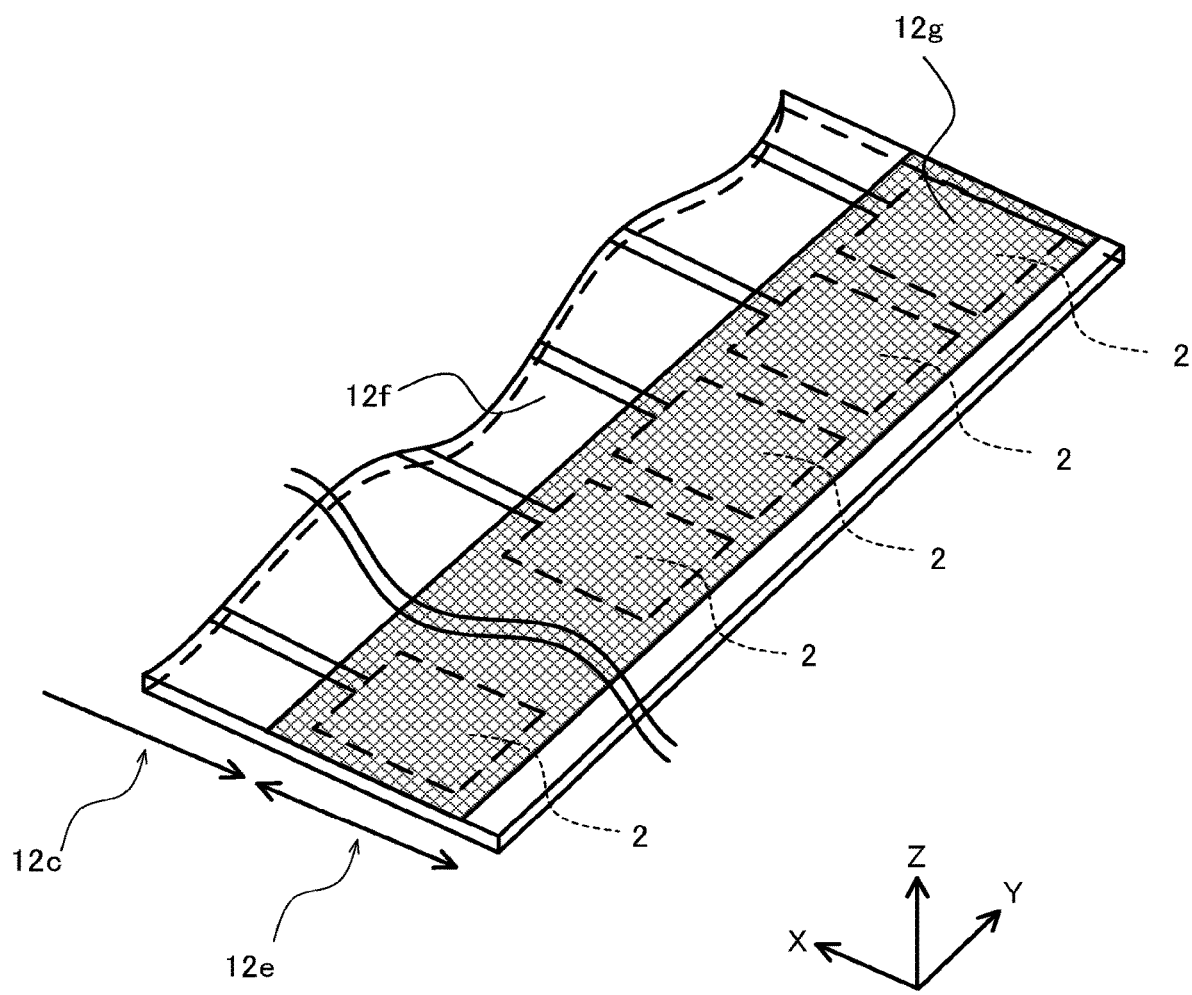
FIG. 31 is a perspective view of the main section of the capacitance detection device according to Embodiment 2.

Detailed description is further made with reference to the second board 12f illustrated in FIGS. 29, 30, and 31. Description of the first board 11f is omitted since the first board 11f and the second board 12f have the same configuration as each other. As illustrated in FIG. 29, the second board 12f has the first end with a bent part 12c and an electrode part 12e. The electrode part 12e is provided with the second electrodes 2 formed along the arrangement direction. A lead wiring is led out from each of the second electrodes 2. The second board 12f is bent at the bent part 12c to bring the second electrode 2 into contact with the second plate 7.

In addition, as illustrated in FIG. 28, securing of a large space for housing the first board 11f in the housing 13a enables mounting of other components. Furthermore, the securing of a large space for housing the first board 11f in the housing 13a increases a range of choice for curvature of the bent part 11c. Similarly, as illustrated in FIG. 28, securing of a large space for housing the second board 12f in the housing 13b enables mounting of other components. In addition, securing of a large space for housing the second board 12f in the housing 13b increases a range of choice for the curvature of the bent part 12c.

The first board 11f has the first end facing the first plate 6 in the electric field direction. In addition, the second board 12f has the first end facing the second plate 7 in the electric field direction. The first board 11 and the second board 12 have a thin-plate shape having side surfaces with lengths in the conveyance direction that are shorter than that of a main surface in the electric field direction. Although the second electrode 2 may be fixed to the second plate 7 by pressing, when strong fixing is desirable, an electrically non-conductive bonding layer 12g is formed on the surface of the second electrode 2, as illustrated in FIGS. 30 and 31, to fix the second electrode 2 to the second plate 7. The bonding layer 12g preferably includes an electrically non-conductive double-sided tape or an electrically non-conductive bonding material. Since the bonding layer 12g is electrically non-conductive, such a bonding layer 12g may be formed over the second electrodes 2 (first electrodes 1) as illustrated in FIG. 31. The first electrode 1 is fixed to the first plate 6 in the same manner as the second electrode 2 is fixed to the second plate 7.

As described above, the first board 11f has the first end bent and brought directly or indirectly into contact with the first plate 6. Similarly, the second board 12f has the first end bent and brought directly or indirectly into contact with the second plate 7. In addition, the first board 11f is not necessarily brought directly or indirectly into contract with the first plate 6, may maintain shape by itself, or may be supported by another component, and the second board 12f is not necessarily brought directly or indirectly into contact with the second plate 7, may maintain shape by itself, or may be supported by another component. That is, the first board 11f may have the first end bent and facing the first plate 6. Similarly, the second board 12f may have the first end bent and facing the second plate 7. The first board 11f and the second board 12f that have the above-described configurations may be used together, and may further be used together with at least one of the first board 11 or the second board 12.

Furthermore, in another capacitance detection devices 21 and 22 according to Embodiment 2, the first board 11f and the second board 12 may be used together, or the first board 11 and the second board 12f may be used together. Furthermore, the first board 11f and the second board 12f may have either one of the first end and the second end. For example, the first board 11f optionally has only the first end, and a portion corresponding to the second end optionally has the same configuration as that of the first board 11. Furthermore, the first board 11f optionally has the second end, and a portion corresponding to the first end optionally has the same configuration as that of the first board 11. Similarly, the second board 12*f* optionally has the first end, and a portion corresponding to the second end optionally has the same configuration as that of the second board 12. Furthermore, the second board 12*f* optionally has the second end, and a portion corresponding to the first end optionally has the configuration as same as that of the second board 12.

As described above, the capacitance detection devices 21 and 22 of the image reading device according s 41 to 58 according to Embodiment 2 similar to the capacitance detection device 20 according to Embodiment 1, include a first electrode 1 and a second electrode 2 at least partially facing each other with a conveyance path 5 therebetween, the conveyance path 5 extending along a conveyance direction in which a sheet-like detection object 3 is conveyed, an oscillating circuit to form an electric field 9 between the first electrode 1 and the second electrode 2, a detection circuit to detect a change in capacitance between the first electrode 1 and the second electrode 2, a first board 11 (first board 11*f*) and a second board 12 (second board 12*f*) including at least one of the oscillating circuit or the detection circuit, an insulative first plate 6 arranged between the first electrode 1 and the conveyance path 5, and an insulative second plate 7 arranged between the second electrode 2 and the conveyance path 5. Furthermore, the image reading devices 41 to 58 include the image reader 14 having the reading position on the upstream side or the downstream side of the first electrode 1 and the second electrode in the conveyance direction. The first electrode 1 and the second electrode 2, as well as the first boards 11 and 11*f*, and the second boards 12 and 12*f*, are disposed forward or rearward of each other in the conveyance direction. With this configuration, the capacitance detection devices 21 and 22 can be down-sized further in the conveyance direction.

The configuration of the capacitance detection device 22 of the image reading device 58 illustrated in FIG. 28 can be applied to other capacitance detection devices, and may be included in a housing other than the housing of the image reading device or the capacitance detection device.

Figure 32:
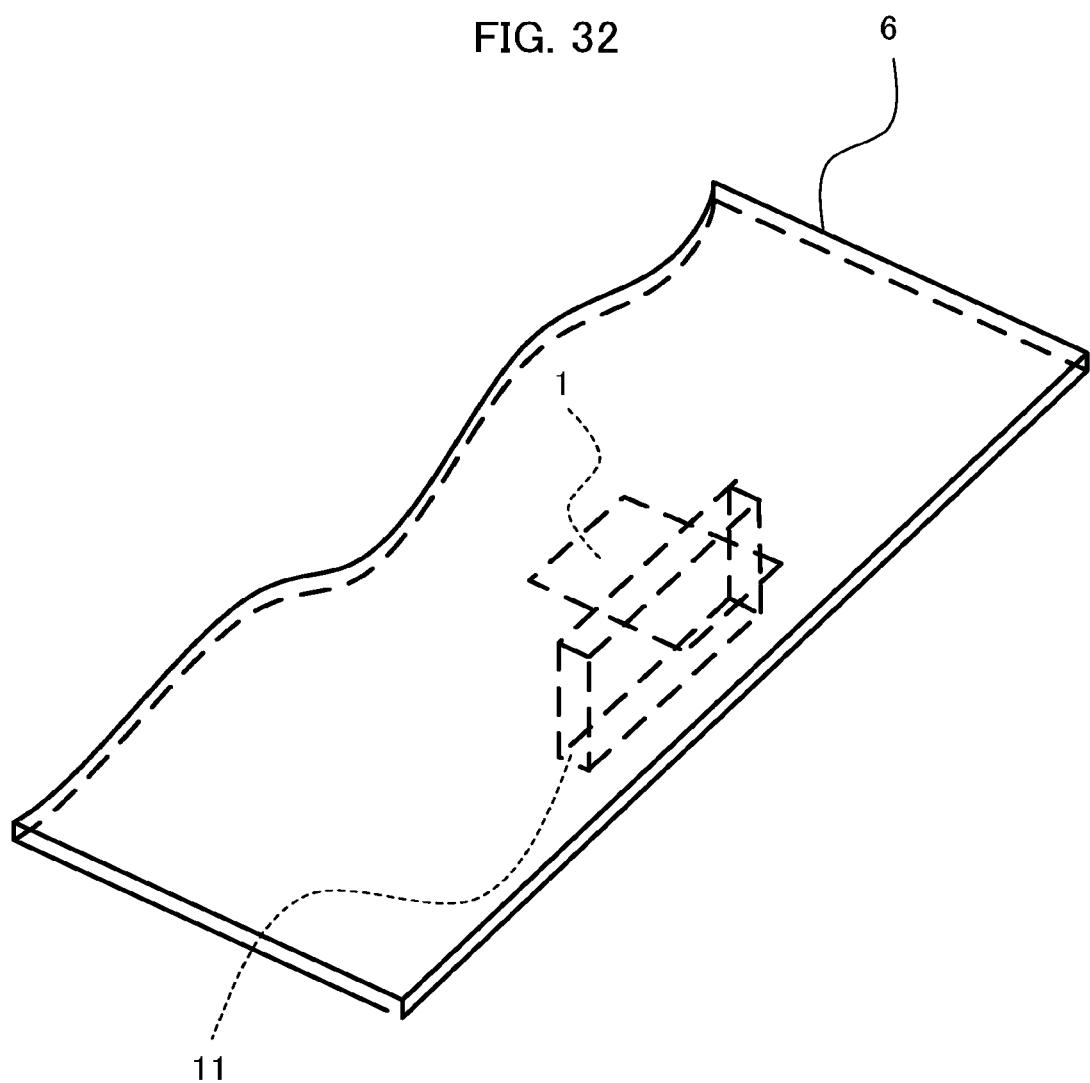
FIG. 32 is a perspective view of the main section of the capacitance detection device (modification) according to Embodiments 1 and 2.

FIG. 32 is a perspective view of the main section of the modification of the capacitance detection devices 20, 21, and 22 according to Embodiments 1 and 2. As illustrated in FIG. 32, the capacitance detection devices 20, 21, and 22 according to Embodiments 1 and 2 may optionally include only one set of the first electrode 1 and the second electrode 2, and optionally only one set of the first board 11 and the second board 12 connected respectively to the first electrode 1 and the second electrode 2. Although illustration is omitted, the capacitance detection devices 20, 21, and 22 according to Embodiments 1 and 2 may have multiple sets each having a first electrode 1 and a second electrode 2 along the arrangement direction as illustrated in FIG. 32. With this configuration, the capacitance detection devices 20, 21, and 22 serve as a point sensor that detects the capacitance of the detection object 3. That is, when the detection object 3 on which foreign matter such as a piece of the tape is attached is conveyed, the capacitance detection devices 20, 21, and 22 having a single first electrode 1 and a single second electrode 2 or a plurality thereof can detect the location of the foreign matter attached on the detection object 3 depending on the positions of arrangement of the first electrodes 1 and the second electrodes 2.

Figure 33:
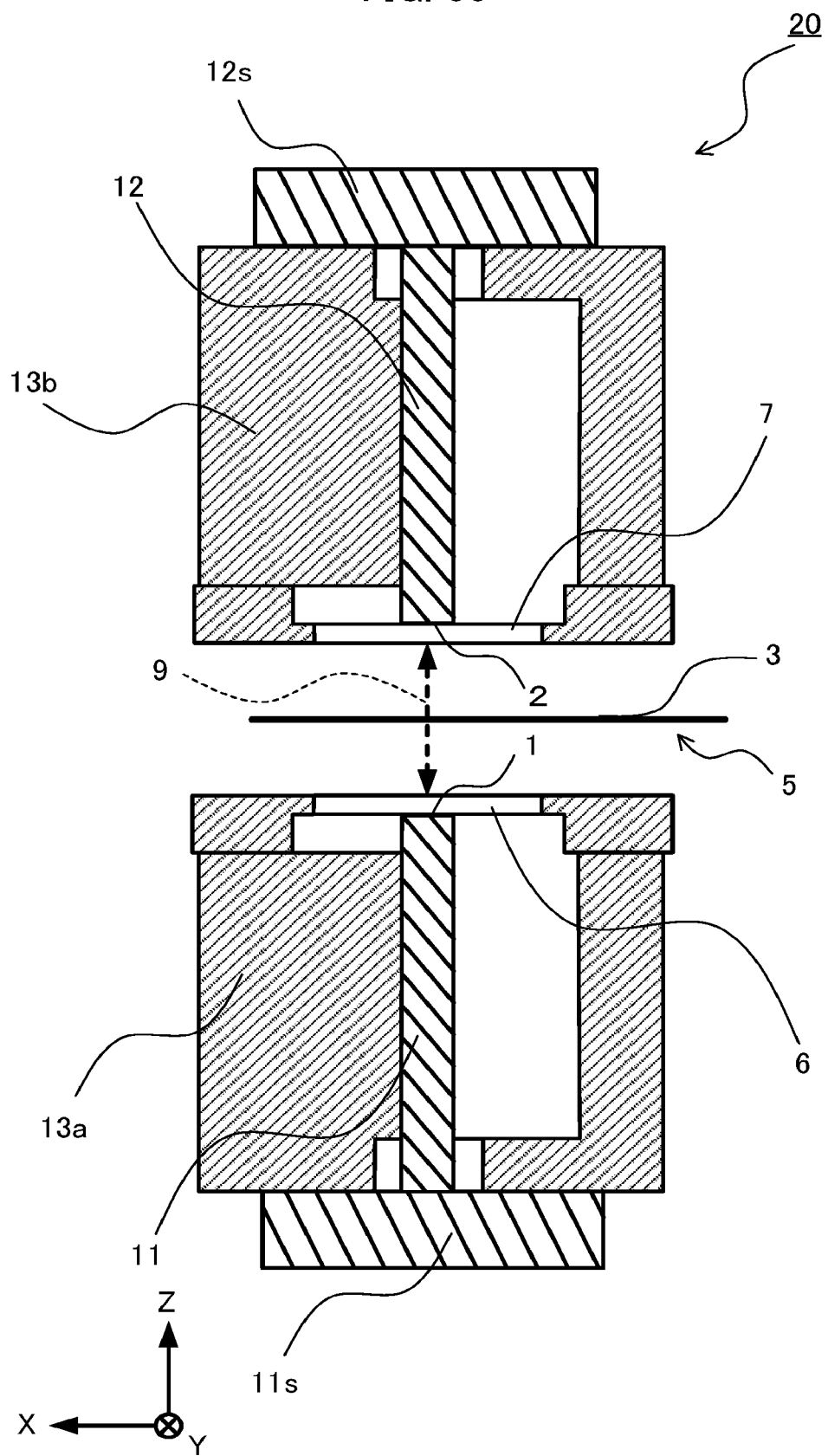
FIG. 33 is a cross-sectional view of the capacitance detection device (modification) according to Embodiments 1 and 2, taken along the conveyance direction and the electric field direction.

FIG. 33 is a cross-sectional view of the modification of the capacitance detection devices 20, 21, and 22 according to Embodiments 1 and 2, taken along the conveyance direction and the electric field direction. As illustrated in FIG. 33, the capacitance detection devices 20, 21, and 22 have the first electrode 1 formed on the side surface of the first board 11. Similarly, the capacitance detection devices 20, 21, and 22 have the second electrode 2 formed on the side surface of the second board 12. In an example illustrated in FIG. 33, the side surface of the first board 11 on which the first electrode 1 is formed faces the first plate 6 in the electric field direction. In addition, the side surface of the second board 12 on which the second electrode 2 is formed faces the second plate 7 in the electric field direction. The first board 11 and the second board 12 have a thin-plate shape with a side-surface length in the conveyance direction less than the main-surface length in the electric field direction.

As described above, the capacitance detection devices 20 to 22 according to Embodiments 1 and 2 (image reading devices 40 to 58) are suitable for a device for detecting the attachment of foreign matter on the detection object 3 such as bank bills and securities, and collecting or shredding the detected bank bills and securities to prevent recirculation.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to betaken in a limiting sense, and the scope of the invention is defined only by the included claims, along with the full range of equivalents to which such claims are entitled.

This application claims the benefit of Japanese Patent Application No. 2018-002416, filed on Jan. 11, 2018, the entire disclosure of which is incorporated by reference herein.

REFERENCE SIGNS LIST

1, 1*b* First electrode
2, 2*b* Second electrode
3 Detection object
5 Conveyance path
6, 6*b* First plate
7, 7*b* Second plate
7*c* Cover member
9, 9*b* Electric field
11, 11*f* First board
11*a*, 12*a* Buffering member
11*b*, 12*b* Side surface wiring
12, 12*f* Second board
11*s*, 12*s* Circuit board
12*g* Bonding layer
11*c*, 12*c* Bent part
11*e*, 12*e* Electrode part
13*a*, 13*b*, 13*c* Housing
14 Image reader
141 First reading position
142 Second reading position
15 Lens element
16 Sensor element
17 Circuit board
17*c* Connector
18*a*, 18*b*, 18*c*, 18*d* Light source
20, 21, 22, 30 Capacitance detection device
40, 41, 42, 43, 44, 45, 46, 47, 48, 49, 50, 51, 52, 53, 54, 55, 56, 57, 58 Image reading device

The invention claimed is:

1. An image reading device, comprising:
   a capacitance detection device comprising
   a first electrode and a second electrode at least partially facing each other with a conveyance path therebetween, the conveyance path extending along a conveyance direction in which a sheet-like detection object is conveyed;
   an oscillating circuit to form an electric field between the first electrode and the second electrode;
   a detection circuit to detect a change in capacitance between the first electrode and the second electrode;
   a first board including at least one of the oscillating circuit or the detection circuit;
   a second board including at least the other one of the oscillating circuit and the detection circuit;
   an insulative first plate arranged between the first electrode and the conveyance path; and
   an insulative second plate arranged between the second electrode and the conveyance path;
   a light source to irradiate the detection object with light; and
   an image reader to read an image with a reflection light from the light source reflected on the detection object or a transmitted light from the light source transmitted through the detection object, wherein
   the first electrode and the second electrode are arranged on an upstream side or a downstream side of the conveyance path in the conveyance direction with respect to an image reading position of the image reader, and
   at least one of the first board or the second board blocks the light irradiated by the light source.

2. The image reading device according to claim 1, wherein at least one of the first board or the second board has a main surface arranged in parallel to a direction that is perpendicular to the conveyance direction.

3. The image reading device according to claim 1, wherein the first board and the second board each have a main surface arranged in parallel to a direction perpendicular to the conveyance direction, and the first board is out of line with the second board in the conveyance direction.

4. The image reading device according to claim 1, wherein the image reader comprises (i) a lens element to converge, via at least one of the first plate or the second plate, light reflected on the detection object or light transmitted through the detection object, and (ii) a sensor element to receive the light converged by the lens element.

5. The image reading device according to claim 4, wherein at least one of the first board or the second board has a main surface arranged in parallel to a direction that is perpendicular to the conveyance direction.

6. The image reading device according to claim 4, wherein the first board and the second board each have a main surface arranged in parallel to a direction perpendicular to the conveyance direction, and the first board is out of line with the second board in the conveyance direction.

7. The image reading device according to claim 1, wherein
   the light source comprises a first light source and a second light source,
   the image reader comprises a first image reader to read an image of a first reading position with reflection light from the first light source reflected on the detection object or transmitted light from the first light source through the detection object, and a second image reader to read an image of a second reading position with reflection light from the second light source reflected on the detection target or transmitted light from the second light source through the detection target,
   the first electrode and the second electrode are arranged between the first reading position and the second reading position in the conveyance direction, and
   at least one of the first board or the second board blocks the light irradiated by the first light source toward the second image reader.

8. The image reading device according to claim 7, wherein at least one of the first board or the second board blocks the light irradiated by the second light source toward the first image reader.

9. An image reading device, comprising:
   a capacitance detection device comprising
   a first electrode and a second electrode at least partially facing each other with a conveyance path therebetween, the conveyance path extending along a conveyance direction in which a sheet-like detection object is conveyed;
   an oscillating circuit to form an electric field between the first electrode and the second electrode;
   a detection circuit to detect a change in capacitance between the first electrode and the second electrode;
   a first board including at least one of the oscillating circuit or the detection circuit;
   a second board including at least the other one of the oscillating circuit and the detection circuit;
   an insulative first plate arranged between the first electrode and the conveyance path; and
   an insulative second plate arranged between the second electrode and the conveyance path;
   a light source to irradiate the detection object with light; and
   an image reader to read an image with a reflection light from the light source reflected on the detection object or a transmitted light from the light source transmitted through the detection object, wherein
   the first electrode and the second electrode are arranged on an upstream side or a downstream side of the conveyance path in the conveyance direction with respect to an image reading position of the image reader, and
   the first board and the second board each have a main surface arranged in parallel to a direction perpendicular to the conveyance direction, and the first board is out of line with the second board in the conveyance direction.

10. The image reading device according to claim 9, wherein the image reader comprises (i) a lens element to converge, via at least one of the first plate or the second plate, light reflected on the detection object or light transmitted through the detection object, and (ii) a sensor element to receive the light converged by the lens element.

* * * * *